US012626269B2

(12) United States Patent
Palmieri et al.

(10) Patent No.: US 12,626,269 B2
(45) Date of Patent: May 12, 2026

(54) SYSTEMS AND METHODS FOR DISTRIBUTING REWARDS TIED TO USER BEHAVIOR IN AN INTERACTIVE VIRTUAL REALITY SYSTEM

(71) Applicant: Qubi, Inc., Irvington, NY (US)

(72) Inventors: Catherine D. Palmieri, Irvington, NY (US); Samuel D. Dillener, Oakton, VA (US); Roger W. Ferguson, Jr., North Palm Beach, FL (US)

(73) Assignee: Qubi, Inc., Irvington, NY (US)

( * ) Notice: Subject to any disclaimer, the term of this patent is extended or adjusted under 35 U.S.C. 154(b) by 22 days.

(21) Appl. No.: 18/094,030

(22) Filed: Jan. 6, 2023

(65) Prior Publication Data

US 2023/0267490 A1 Aug. 24, 2023

Related U.S. Application Data

(60) Provisional application No. 63/311,753, filed on Feb. 18, 2022.

(51) Int. Cl.
*G06Q 30/02* (2023.01)
*G06F 3/01* (2006.01)
(Continued)

(52) U.S. Cl.
CPC ......... *G06Q 30/0209* (2013.01); *G06F 3/011* (2013.01); *G06F 3/04815* (2013.01);
(Continued)

(58) Field of Classification Search
USPC ....................................................... 705/14.1
See application file for complete search history.

(56) References Cited

U.S. PATENT DOCUMENTS 8,545,232 B1 10/2013 Bardige et al.
10,120,413 B2 11/2018 Aimone et al.
(Continued)

FOREIGN PATENT DOCUMENTS

KR 10_2020_0107090 A 9/2020
KR 10-2299723 B1 9/2021
(Continued)

OTHER PUBLICATIONS

Alsubhi et al. "The Challenge of Increasing Student Engagement in E-Learning Platforms," International Conference on Electrical Engineering and Informatics, Jul. 9-10, 2019, Bandung, Indonesia; 6 pages.
(Continued)

*Primary Examiner* — Afaf Osman Bilal Ahmed
(74) *Attorney, Agent, or Firm* — Morrison & Foerster LLP

(57) ABSTRACT

Systems and methods for distributing rewards based on user behavior in an interactive virtual reality system are provided. A map corresponding to a user's location is displayed on a user device, the map including a virtual avatar within the map having a virtual avatar position indicating the user's location within the map. One or more virtual reward locations are displayed within the map, wherein each virtual reward location within a predetermined proximity of the avatar position is identified with a merchant-specific icon and each virtual reward location outside the predetermined proximity is identified with a general reward icon. A notification is displayed that the user has collected a virtual reward when the user provides an indication that they have moved to a first virtual reward location. When collecting a virtual reward for the first reward location, the user device receives reward data corresponding to the virtual reward.

19 Claims, 10 Drawing Sheets

400

(51) Int. Cl.

| | |
|---|---|
| *G06F 3/04815* | (2022.01) |
| *G06F 3/04817* | (2022.01) |
| *G06F 3/0482* | (2013.01) |
| *G06Q 30/0207* | (2023.01) |
| *G06T 11/00* | (2006.01) |
| *G07F 17/32* | (2006.01) |
| *G06Q 20/10* | (2012.01) |
| *G06Q 20/38* | (2012.01) |

(52) U.S. Cl.

CPC ........ *G06F 3/04817* (2013.01); *G06F 3/0482* (2013.01); *G06T 11/00* (2013.01); *G07F 17/3255* (2013.01); *G06Q 20/10* (2013.01); *G06Q 20/381* (2013.01); *G06T 2200/24* (2013.01); *G07F 17/323* (2013.01)

(56) References Cited

U.S. PATENT DOCUMENTS

| | | | | |
|---|---|---|---|---|
| 10,445,758 | B1* | 10/2019 | Bryer | G06Q 40/08 |
| 11,103,773 | B2 | 8/2021 | Rathod | |
| 2012/0215617 | A1 | 8/2012 | Shah et al. | |
| 2013/0006737 | A1* | 1/2013 | Goldberg | G06Q 30/02 |
| | | | | 705/14.12 |
| 2013/0041740 | A1 | 2/2013 | Tyler et al. | |
| 2013/0046595 | A1 | 2/2013 | Wu et al. | |
| 2013/0178257 | A1 | 7/2013 | Langseth | |
| 2014/0358651 | A1* | 12/2014 | Koh | G06Q 20/065 |
| | | | | 705/14.12 |
| 2018/0345129 | A1 | 12/2018 | Rathod | |
| 2018/0349703 | A1* | 12/2018 | Rathod | A63F 13/65 |
| 2019/0107935 | A1* | 4/2019 | Spivack | G06Q 30/0277 |
| 2020/0051460 | A1 | 2/2020 | Bedor et al. | |
| 2020/0294097 | A1 | 9/2020 | Spivack et al. | |
| 2021/0103340 | A1 | 4/2021 | Bradski et al. | |

FOREIGN PATENT DOCUMENTS

| | | | |
|---|---|---|---|
| WO | 2017/184646 | A1 | 10/2017 |
| WO | 2018/164636 | A1 | 9/2018 |
| WO | 2020/096993 | A1 | 5/2020 |

OTHER PUBLICATIONS

Beemer et al. (2019). "A Pilot Intervention Using Gamification to Enhance Student Participation in Classroom Activity Breaks," International Journal of Environmental Research and Public Health 16: 4082; 11 pages.

Khowaja et al. (2020). "Augmented Reality for Learning of Children and Adolescents With Autism Spectrum Disorder (ASD): A Systematic Review," IEEE Access 8; pp. 78779-78807.

Nikolaos et al. "QR-Code Calibration for Mobile Augmented Reality Applications," SIGGRAPH 2010, Los Angeles, California, Jul. 25-29, 2010; 1 page.

Wen (2016). "Connecting Mobile Game Advertising with Local Stores," University of Tampere M.Sc. thesis; 61 pages.

International Search Report and Written Opinion dated Jun. 7, 2023, directed to International Application No. PCT/US2023/062566; 18 pages.

* cited by examiner

100

200

400

402

404

408

406

412

410

500

<u>600</u>

700

Amount
Vested

Time

800

802

804

806

900

1000

1002

1004

SYSTEMS AND METHODS FOR DISTRIBUTING REWARDS TIED TO USER BEHAVIOR IN AN INTERACTIVE VIRTUAL REALITY SYSTEM

CROSS-REFERENCE TO RELATED APPLICATIONS

This application claims the benefit of U.S. Provisional Application No. 63/311,753, filed Feb. 18, 2022, the entire contents of which is incorporated herein by reference.

FIELD OF THE DISCLOSURE

This invention relates generally to a system and methods for distributing rewards in a virtual reality system, and more particularly, to a system and methods for distributing rewards based on user behavior in an interactive virtual reality system.

BACKGROUND OF THE DISCLOSURE

With the rise of digital shopping, traditional brick-and-mortar businesses struggle to generate foot traffic and sales. Many businesses and vendors thus turn to advertisement campaigns. However, current advertisement campaigns can result in a large portion of the advertisement dollars of a given campaign spent reaching "non-target" customers, evidenced by only a small percentage of total sales being attributable to one or more advertisement campaigns. Additionally, in current advertisement campaigns, it is difficult to correlate a given sale with a given advertisement, which makes accurately calculating the return on investment of an advertisement campaign difficult. Current methods to correlate sales with advertisements rely on determining a directional correlation between a "dark" market's sales, without advertisements, and another market's sales with varying levels and combinations of advertisements. However, such correlation methods incorporate variables and thus lack accuracy.

Gamification is a method to motivate or engage users by introducing game mechanics such as goal setting, feedback, and external rewards, to non-game environments. Gamification presents a viable means to encourage certain desired behavior in a multitude of environments. Recently, augmented reality gaming platforms have proven to be effective drivers of foot traffic to a given area. For example, Pokémon Go™ which is an augmented reality gaming application where players travel within an augmented reality version of the real world to collect virtual monsters via a user interface on a mobile device, has driven a large number of players to visit geolocations where the game indicates virtual monsters are located. Similarly, gamification has proven to be an effective tool to engage students in learning environments. For example, awarding badges or stickers to students can increase student motivation to participate. However, gaming applications can suffer with user retention based on a short attention span of users. To combat this issue, certain gaming applications incorporate time-limiting elements such as a waiting period in order to incentivize gamers to return to the application repeatedly.

SUMMARY OF THE DISCLOSURE

As stated above, traditional advertisement campaigns lack the ability for a merchant to discern clear return on investment and can result in large portions of advertisement dollars being spent on non-target customers. Additionally, merchants struggle with drawing customers to brick-and-mortar business locations and encouraging customers to make purchases at those locations. Thus, there is a need for an improved advertising platform that effectively draws customers to a desired location and encourages customers to spend upon visiting that location. As explained above, augmented reality systems demonstrate a viable platform to draw people to certain areas, and gamification can be applied to encourage people to perform desired behaviors. Thus, a gamified augmented reality platform can also be useful to encourage desired user behavior. For example, an advertising platform that incorporates a gamified augmented reality system may enable merchants to draw customers to desired locations. Accordingly, disclosed herein are systems and methods that may address some of the above-identified needs.

Disclosed herein are systems and methods for implementing an interactive virtual reality system with location-based rewards. An administrator server can receive advertisement information from a plurality of merchants relating to advertisement campaigns with location based rewards. The location based rewards can be collected by a plurality of users on a user device, such as a mobile phone. Upon collecting a given reward, the user can be encouraged to spend the reward at the given location by offering a variable reward worth 100% if redeemed at a merchant corresponding to the location of the location based reward or some lesser percentage if redeemed to the user's wallet. The administrator server can be configured to store reward data for each user participating in the interactive virtual reality system and to manage the redemption process of rewards. Some rewards can correspond to real-world currency that is subject to a vesting schedule before the user can spend or transfer the currency. Some rewards can correspond to a digital coupon for a participating merchant within the system. The administrator server can also be configured to manage merchant advertisement accounts. The administrator server can provide invoices to participating merchants that only charge the merchant an advertising fee for each reward a user collects of a given number of rewards within an advertising campaign of the merchant.

In some embodiments, a virtual rewards method using an interactive virtual reality system comprises: transmitting virtual reality data to a user device, the virtual reality data corresponding to a map that includes a user location corresponding to a location of the user device within the map and an avatar position corresponding to the user location, the avatar position updating as the user location updates, transmitting reward location data to the user device, the reward location data corresponding to a plurality of virtual reward locations located within the map wherein each virtual reward location within a predetermined proximity of the avatar position is identified with a specific reward icon and each virtual reward location outside the predetermined proximity is identified with a general reward icon, receiving from the user device an indication that the user has collected a virtual reward at a first virtual reward location, transmitting notification data to the user device, the notification data showing that the user has collected the virtual reward, and transmitting reward data to the user device, the reward data corresponding to the virtual reward for the first virtual reward location.

The reward data may include a first option and a second option and the method further comprises receiving from the user device a selection of either the first option or the second option. The first option can enable a user to redeem a full-value reward usable at a specific real-world merchant and the second option enables a user to redeem a lesser-value digital unit that can be stored in a digital wallet. The specific reward icon may be a merchant-specific icon corresponding to a real-world merchant offering a reward at the virtual reward location identified by the specific reward icon. When the avatar position is within a predetermined proximity of a first virtual reward location and a second virtual reward location, the specific reward icon identifying each of the first virtual reward location and the second virtual reward location may be a unique merchant-specific icon corresponding to different real-world merchants.

Receiving the indication from the user device may occur automatically when the user device scans a QR code at a real-world location corresponding to the first virtual reward location. Receiving the indication from the user device can occur automatically when the user device scans an RFID tag at a real-world location corresponding to the first virtual reward location. Receiving the indication from the user device may occur automatically when the user location is within a predetermined distance of a GPS beacon located at a real-world location corresponding to the first virtual reward location.

In some embodiments, the virtual reward can only be used within a predetermined time after transmitting the reward data. The virtual reward may be a digital unit that can be used at a real-world merchant corresponding to the first virtual reward location. In some embodiments, the digital unit can only be used at the real-world merchant within a predetermined time after transmitting the reward data.

The method may comprise transmitting command data to the user device, the command data containing instructions to remove the first virtual reward location from the map when a predetermined number of rewards for the first virtual reward location have been collected. The real-world merchant may pay a fee when the virtual reward is collected at a virtual location corresponding to the real-world merchant. The method may comprise transmitting bonus reward data to the user device, the bonus reward data being transmitted randomly.

The virtual reward may be a digital unit that corresponds to a real-world currency. The method may comprise, after receiving a first user command, converting the digital unit to the real-world currency; and transmitting currency data to the user device, the currency data corresponding to the real-world currency value of the digital unit. The method may comprise, after receiving a second user command, transferring the real-world currency value of the converted digital unit to a bank account. Converting the digital unit to real-world currency may not occur until after completion of a vesting schedule. Completion of the vesting schedule can require allowing a predetermined period of time to pass after transmitting the reward data.

In some embodiments, a non-transitory machine readable medium stores instructions that, when executed by at least one processor of a computing device, cause the device to perform operations comprising: transmitting virtual reality data to a user device, the virtual reality data corresponding to a map that includes a user location corresponding to a location of the user device within the map and an avatar position corresponding to the user location, the avatar position updating as the user location updates, transmitting reward location data to the user device, the reward location data corresponding to a plurality of virtual reward locations located within the map wherein each virtual reward location within a predetermined proximity of the avatar position is identified with a specific reward icon and each virtual reward location outside the predetermined proximity is identified with a general reward icon, receiving from the user device an indication that the user has collected a virtual reward at a first virtual reward location, transmitting notification data to the user device, the notification data showing that the user has collected the virtual reward, and transmitting reward data to the user device, the reward data corresponding to the virtual reward for the first virtual reward location.

In some embodiments, an interactive virtual reality system comprises: one or more processors coupled to one or more memory devices, wherein the one or more memory devices include instructions that when executed by the one or more processors cause the system to: transmit virtual reality data to a user device, the virtual reality data corresponding to a map that includes a user location corresponding to a location of the user device within the map and an avatar position corresponding to the user location, the avatar position updating as the user location updates, transmit reward location data to the user device, the reward location data corresponding to a plurality of virtual reward locations located within the map wherein each virtual reward location within a predetermined proximity of the avatar position is identified with a specific reward icon and each virtual reward location outside the predetermined proximity is identified with a general reward icon, in response to receiving an indication from the user device, transmit notification data to the user device, the notification data showing that the user has collected a virtual reward at a first virtual reward location, and transmit reward data to the user device, the reward data corresponding to the virtual reward for the first virtual reward location.

It will be appreciated that any of the variations, aspects, features and options described in view of the systems can be combined.

Additional advantages will be readily apparent to those skilled in the art from the following detailed description. The aspects and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

Exemplary embodiments are described with reference to the accompanying figures, in which.

DETAILED DESCRIPTION OF THE DISCLOSURE

Figure 1:
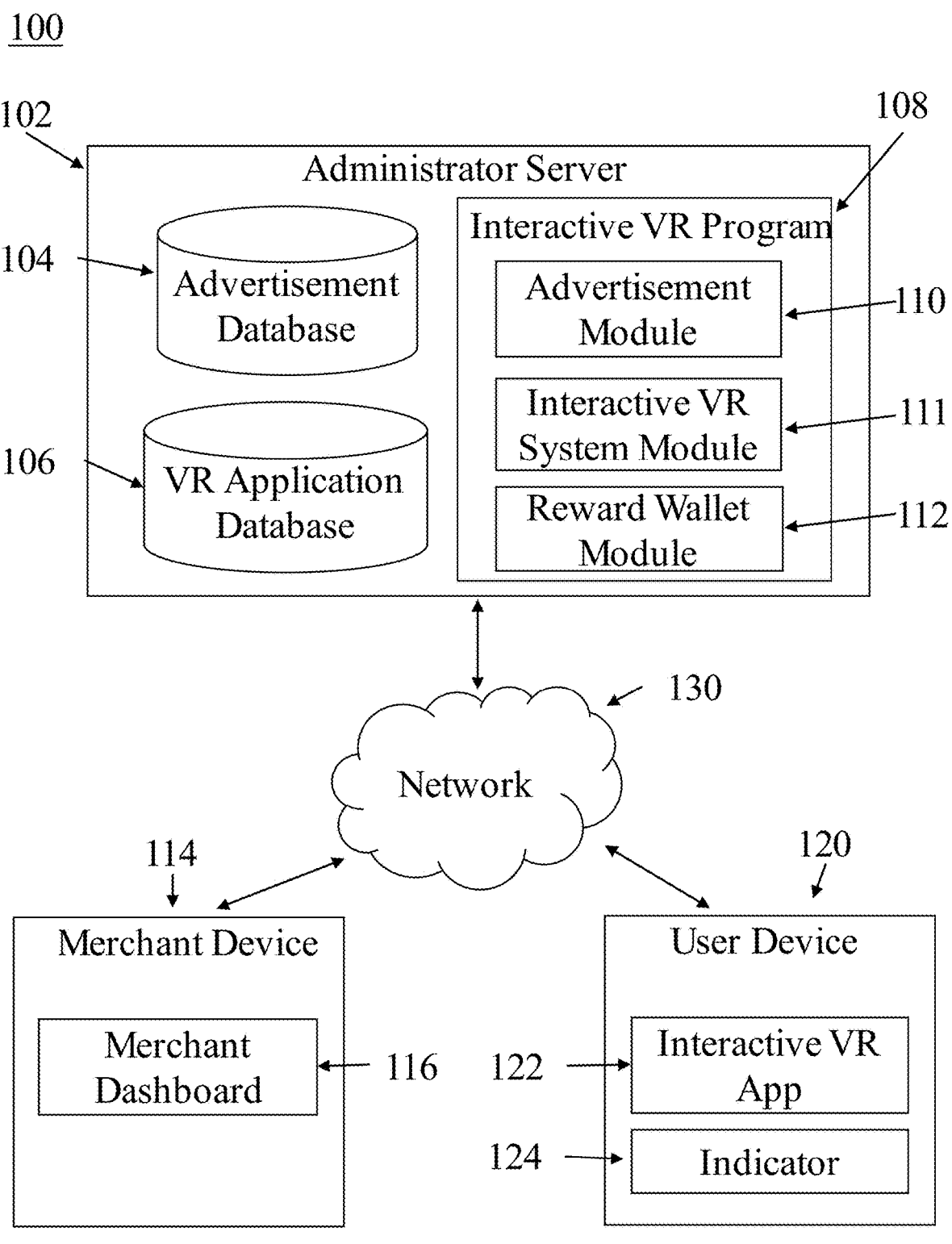
FIG. 1 depicts an exemplary computer-based system for implementing an interactive virtual reality (VR) system with location-based rewards, in accordance with some embodiments.

Disclosed herein are systems and methods for distributing rewards based on user behavior. Rewards can be offered by merchants in an interactive virtual reality (VR) system displayed on a mobile device. Alternatively, rewards can be offered by educational entities in an interactive educational game displayed on a mobile device.

Rewards offered by merchants in an interactive VR system can more effectively draw customers to desired physical locations than prior advertising platforms by presenting rewards to users within an interactive reward map. The interactive VR system can solve the issues associated with merchants spending advertisement dollars on non-target customers by providing an advertising platform wherein a given merchant pays for advertising services only when a given reward offered by the merchant is collected by a user.

The interactive VR system can enable a merchant to offer virtual rewards to customers using an application on a mobile device. The virtual rewards can be collected by users who visit a specified geolocation and follow the appropriate instructions to collect the reward. For example, a merchant can specify a virtual reward is available to users who visit the brick-and-mortar business location of the merchant and scan a quick-response (QR) code located on a counter in the business location. As such, the interactive VR system enables merchants to provide incentives for users to visit their business location and thus provides a new method for merchants to generate foot traffic.

In some embodiments, the interactive VR system can provide a pricing scheme wherein merchants only pay the system administrator upon collection of a reward for a given campaign. For example, the merchant can be charged by the administrator only when users collect a reward from a given campaign, thereby demonstrating a clear one-to-one relationship between advertisement costs and a sale. Thus, the interactive VR system can enable merchants to clearly correlate return on investment costs of a given advertising campaign.

The interactive VR map can provide an improved platform enabling users to collect and use rewards offered by merchants more easily. For example, whereas redeeming a paper coupon requires the user to save the physical coupon and bring it to the business location, the interactive VR system enables a user to both collect and redeem a digital coupon using their mobile device. Further, the interactive VR system similarly provides an improved benefit relative to redeeming a coupon received through an email campaign because the user does not have to search through an email inbox in order to find a given coupon. Instead, the user can both collect and redeem a coupon using an application on their mobile device simply by visiting the business location.

The ease of collecting and using virtual rewards may also incentivize users to open the application on their mobile device wherever they travel. For example, virtual rewards can be collected using a mobile device and stored in a mobile application upon collection. Thus, users are incentivized to simply open the application whenever they are near business locations to check to see what offers are available and to then collect those offers either to be used immediately or stored for future use.

The virtual rewards may include digital units corresponding to real-world currency. The real-world currency may be usable within a user wallet within interactive VR system at any number of participating merchants within the system. Alternatively, virtual rewards may be coupons usable at a participating merchant. For example, a user may collect a coupon for a specific merchant upon scanning a QR code at the merchant counter and immediately use the coupon on their purchase. Alternatively, the user may store the coupon in a digital wallet for future use.

The interactive VR system can also encourage customers to spend upon visiting a given location by offering variable rewards. For example, a given reward offered by a merchant may be worth full-value (100%) if redeemed and used immediately, and can decrease in value if not redeemed and used immediately. In some embodiments, the reward can be collected and stored for future use. However, a reward stored for future use may have a reduced value relative to a reward immediately used. For example, upon collecting a given reward, a user may be prompted to select an option to collect the reward for 100% value if redeemed immediately at that merchant, or an option to collect the reward for 20% value if stored in a user wallet within the interactive VR system.

The interactive virtual reality system can also include a wallet management system that incorporates techniques to ensure customer retention. Such techniques can include a time-limiting vesting period. For example, a user may collect a digital reward worth $20 subject to a specified vesting period. Thus, the user will be motivated to continue using the application until that reward vests and becomes usable. Similarly, because the interactive VR system simplifies the process for users to collect rewards, users will be incentivized to continuously open the application on their device to continuously collect rewards, and use and/or store rewards.

The wallet management system can also be used to manage rewards offered by educational entities via an education system module. The education system module can be displayed in an application on a mobile device and can improve student engagement and participation by offering monetary rewards for specified behavior. In some embodiments, the educational system can offer monetary rewards for correct answers to educational quizzes. The educational system can enable teachers to create quizzes tailored to the subjects being taught and the progression of a class within a subject. Additionally, the educational system can offer monetary rewards based on student attendance. For example, students can verify attendance for a given lesson using their mobile device by using a check-in feature based on their geographic location. The location can be based on classes taught in a specific room in a school, or at a specified remote location. Beneficially, by introducing game elements such as feedback and external rewards in an educational application, the education system module can increase student participation and engagement in educational activities.

The wallet management system can similarly be used to manage rewards offered by advertisers via an advertiser quiz system module. The advertiser quiz system module can be displayed in an application on a mobile device and can enable advertisers to sponsor quiz games via displaying advertisements in the application. In non-limiting examples, the advertiser quiz system module can enable advertisers to sponsor educational quizzes, administrator-created quizzes, advertiser-created quizzes, etc. The advertiser quiz system can offer monetary rewards based on user performance in the quiz.

In some embodiments, the reward wallet management system can be used to manage rewards offered by government entities via a government distribution system module. The government distribution system module can be displayed on a mobile device or other computing device to users and/or merchants. The government distribution system can facilitate distribution of funds to users in remote areas without widely accessible banking institutions and thereby improve financial inclusion across a population. The government distribution system can also enable quick government entity response in time-sensitive situations such as providing funds to users and merchants after a natural disaster or providing funds to groups such as refugee camps or organizations assisting people within a specific geographic area.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Disclosed herein are systems that may address one or more of the needs discussed above.

Interactive VR System

FIG. 1 depicts an exemplary computer-based system 100 for implementing an interactive virtual reality (VR) system with location-based rewards. In some embodiments, system 100 enables advertisers to create virtual icons and assign certain parameters for users to collect them within an interactive virtual reality system. Users can explore a virtual reality system that may include a map with various icons corresponding to a given reward assigned by an advertiser. If the user satisfies the appropriate procedure to collect a reward, the user can elect to redeem the reward at the particular advertiser or to store a reduced value version of the reward for future use.

As shown, in some embodiments, system 100 can include an administrator server 102 that is connected to user device 120 and merchant system 114 over network 130. Administrator server 102 can house interactive VR program 108, advertisement database 104 and VR application database 106. Interactive VR program 108 can include advertisement module 110, interactive VR system module 111, and reward wallet module 112.

As used herein, "module" refers to computer logic that contains one or more routines that make up a sub-component of a broader computer program. A module can be implemented in hardware, firmware, and/or software controlling a general purpose processor. According to one embodiment, a module can include programming code stored on a storage device corresponding to the module that are loaded into memory and executed by a processor. In another embodiment, a module can be computer executable instructions stored in a tangible computer-readable storage medium.

Although only one user device 120 and one merchant system 114 are illustrated in FIG. 1, it should be understood that any number of user devices and any number of merchant systems can be connected to administrator server 102 over network 130. Merchant system 114 can include any computing device located at a given merchant location. Merchant system 114 may provide access to cloud services in order to receive and transmit information. User device 120 can be a mobile smartphone, a communication-enabled tablet or laptop, or any other mobile device capable of computation, storage, input, output, and display, that is similar to or superior to existing smartphones, tablets, and laptops.

According to some embodiments, administrator server 102 may be a virtual server in a virtual machine environment hosted by a third party. The virtual machine environment can include one or more processors and one or more memory devices in communication with an administrator device via network 130. A virtual administrator server may be configured to execute interactive VR program 108 using instruction contained in the one or more memory devices executed by the one or more processors. Alternatively, administrator server 102 can be any local computing device located at an administrator site. A local administrator server 102 can include a processor and a memory. The memory can store instructions that when executed by the processor cause the processor to perform operations.

Administrator server 102 can be in communication with advertisement database 104 and VR application database 106. In some embodiments, administrator server 102 can communicate with various user devices 120 within system 100 over a local public switched telephone network (PTSN) or telephone system using data transfers or other wireless protocol, such as SMS texts. Accordingly, administrator server 102 can still communicate with user device 120 when the user device is in a location with limited bandwidth or without broadband internet access.

In some embodiments, VR application database 106 can store data used in interactive VR program to be provided to users on a user device 120 over network 130. The data stored in VR application database 106 can include data used in interactive VR program 108. For example, data used in interactive VR program 108 can include: (1) interactive map data, (2) user data, and (3) reward data. Interactive map data can include geographic coordinates of buildings and landmarks of a real world area, geographic coordinates corresponding to virtual reward locations, imagery data to display a map of an area with virtual reward icons at each virtual reward location and an avatar representative of a user location within the map, etc. User data can include identifying information associated with each user of the VR application, a geographic location associated with the real world location of each user, etc. Reward data can include icons associated with a given virtual reward, merchant-specific icons, general reward icons, information regarding how to collect a given reward and what type of reward is available from a given virtual reward, etc.

According to some embodiments, advertisement database 104 can store advertisement data supplied by merchants to be used in interactive VR program 108. In non-limiting examples, the data stored in advertisement database 104 may include: (1) merchant information, (2) advertisement campaign information, and (3) advertisement campaign metrics. Merchant information can include identifying information of a participating merchant such as a merchant logo, payment mechanisms, enrollment and contact information, etc. Advertisement campaign information for a given merchant can include advertisement parameters such as reward type, advertisement period, number of rewards available or total value of rewards available, etc. Advertisement campaign metrics for a given advertisement campaign can include return on investment information, frequency of reward redemption information, remaining campaign balance or period, number of unique users who have redeemed rewards, etc.

Advertisement data can be received from a merchant system 114 via network 130. In some embodiments, a merchant may specify information for a given advertisement using merchant dashboard 116 in merchant system 114. Merchant dashboard 116 can include a user interface implemented by advertisement module 110 that enables a given merchant to create an advertising campaign and specify advertisement parameters for the campaign to be delivered to users via interactive VR system module 111.

Advertisement Module

Figure 2:
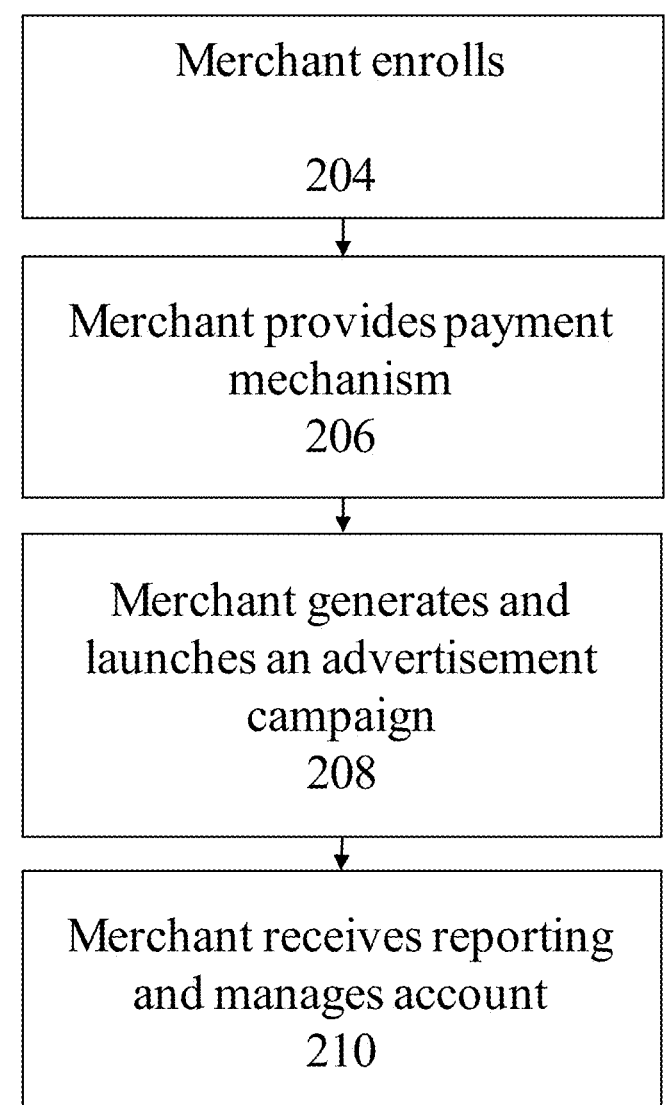
FIG. 2 depicts a method for a merchant to generate an advertisement campaign for an interactive VR system, in accordance with some embodiments.

FIG. 2 depicts a method 200 for a merchant to generate an advertisement campaign for interactive VR program 108, in accordance with some embodiments. Method 200 can be implemented using a merchant dashboard in a merchant system in communication with an administrator server, such as merchant dashboard 116, merchant system 114 and administrator server 102 of system 100. In some embodiments, method 200 can be provided to a merchant by advertisement module 110 of system 100.

At block 204, in some embodiments, a merchant can enroll to participate in an advertisement platform. A merchant may enroll using a merchant dashboard in a merchant system that is in communication with an administrator server, such as merchant dashboard 116, merchant system 114 and administrator server 102 of system 100. According to some embodiments, the advertisement platform can be implemented by advertisement module 110 of system 100. When enrolling, a merchant can provide certain identifying information such as contact information, merchant logo, geographic location, etc. The identifying information may be stored in an advertisement database such as advertisement database 104 of system 100.

As shown in block 206, in some embodiments, a merchant can provide a payment mechanism. A merchant may provide a payment mechanism according to instructions provided by advertisement module 110. Advertisement module 110 may provide pricing information to a merchant and generate invoices based on the merchant's account.

At block 208, in some embodiments, a merchant can generate and launch an advertisement campaign. A merchant may generate and launch an advertisement campaign using advertisement module 110. According some embodiments, advertisement module 110 can enable a merchant to create an entirely new campaign by designating a campaign icon, a reward type, a period for the campaign, a reward collection location, and a payment scheme.

When generating and launching an advertisement campaign, a merchant may be prompted to select a reward type that can be collected. The reward type may be a coupon for a specific merchant or a reward of one or more digital units corresponding to real-world currency. The merchant may also be prompted to specify reward data such as a title for the reward, reward type, the reward icon that will be displayed to the user, information regarding how the user can collect the reward, reward terms and conditions etc. In some embodiments, the reward data will be categorized into a title and sub-title that will be displayed when the reward is selected by a user. For example, when the user selects a given reward the interactive VR app 122 may display a title including general reward information such as the merchant name, type and amount of reward, and a sub-title including information such as the terms and conditions of the reward, the expiration date of the reward, a coupon code, etc. According to some embodiments, when generating an advertisement campaign, the merchant may view an advertisement preview on their merchant dashboard 116 before launching the campaign.

The reward location for a given advertisement campaign is the location within a VR map that users must visit in order to collect the offered reward. In some embodiments, the merchant may specify that a user must be within a predefined proximity to the merchant's business location in order to collect a reward. In setting the proximity, a merchant has control over the generation of foot-traffic to their physical business location and thus provides a means for the merchant to encourage and generate foot traffic. Alternatively, a merchant may specify the location is a specific location within the VR map that is not necessarily near the merchant's business location. For example, a merchant may specify that a reward can be collected near a competitor's business location and then redeemed at the merchant's business location elsewhere. In some embodiments, a merchant may offer a reward that can be redeemed at their business location but collected at a location within the VR map that corresponds to a heavily trafficked area such as outside of a public transit area, a mall, or near a collection of restaurants, in non-limiting examples.

The payment scheme for a given campaign can, in some embodiments, be set by a merchant such that campaign funds are deducted from a campaign budget only upon a collection of a reward by a user. For example, the payment scheme can be a specified fee due to a system administrator for every user who collects a reward. Beneficially, this enables a merchant to entirely eliminate advertisement dollars being wasted on non-target customers as only customers who actually collect a reward generate a fee due to the system administrator. In some embodiments, the merchant can specify a budget for a particular campaign of an indefinite period, such that the campaign continues until the budget is exhausted. In some embodiments, the merchant can specify a budget for a particular campaign of an indefinite period, such that the campaign continues until the budget is exhausted.

In some embodiments, advertisement module 110 can enable a merchant to re-launch a prior campaign. To re-launch a prior campaign, a merchant can, in some embodiments, select a new period for the campaign or specify a new budget and payment scheme. Beneficially, by enabling a merchant to design, update, and launch campaigns themselves, the interactive VR system enables merchants to autonomously control their advertisement campaigns without relying on a third party to build campaigns for them.

According to some embodiments, a merchant can participate in an existing program. An existing program can be an activity organized and hosted by an administrator. For example, the administrator may host a scavenger hunt on a particular day and indicate that certain businesses within a defined region can elect to participate in the scavenger hunt. In some embodiments, existing activities can be displayed on a merchant dashboard, such as merchant dashboard 116, and include participation information. Such participation information can include parameters for users to collect a virtual reward in the activity, the cost to a merchant to participate in the activity and a projected return on participation. For example, an existing program could be a scavenger hunt organized by an administrator server on a specified date that dictates certain businesses within a defined region can elect to participate in the activity.

At block 210, in some embodiments, a merchant can receive reporting for one or more active or lapsed campaigns and manage the merchant's account. The merchant may receive a reporting from advertisement module 110. Advertisement module 110 may report campaign metrics such as remaining campaign period, remaining campaign budget, remaining rewards available to users, value of rewards that have been collected, etc. By providing campaign metrics to merchants, the interactive VR system enables merchants to clearly correlate the return on investment of a given campaign.

In some embodiments, advertisement module 110 can enable merchants to manage campaigns and manage the merchant's account. Managing a campaign can include, for example, ending a campaign early, extending a campaign, increasing a campaign budget, decreasing a campaign budget, etc. Managing a merchant account can include updating payment information, updating merchant contact information, updating merchant geographic location, etc.

Interactive VR System Module

Figure 3:
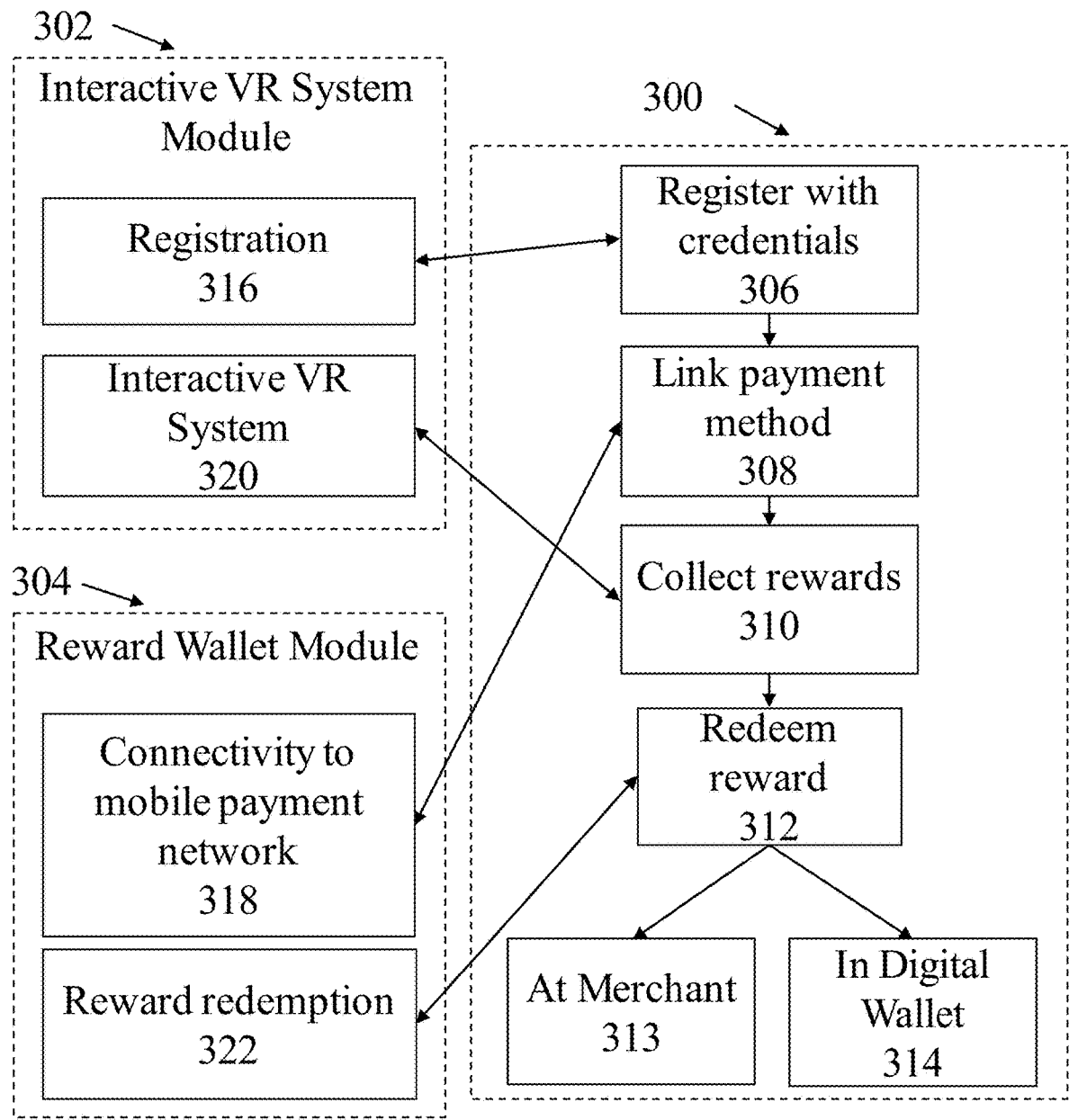
FIG. 3 depicts a method for a user to collect and redeem rewards in an interactive VR system, in accordance with some embodiments.

FIG. 3 depicts a method 300 for a user to collect and redeem a reward in an interactive VR system, in accordance with some embodiments. Method 300 can be implemented using an interactive VR application on a user device in communication with an administrator server, such as interactive VR app 122 on user device 120 in communication with administrator server 102 of system 100. Method 300 can be presented to a user by interactions created by module 302 and module 304. Module 302 can be interactive VR system module 111 of system 100. Module 304 can be reward wallet module 112 of system 100.

At block 306, in some embodiments, a user can register to participate in an interactive VR system. Registration can include the user providing and verifying contact information, choosing a username, selecting an avatar image, etc. The user may register via a user interface provided by module 302. Module 302 can include a sub-component for registration, such as registration block 316. To register, a user may be required to complete information for a user profile. Information for a user profile can include, but is not limited to, the user's name and address. A unique numerical identifier may be assigned to each new user who registers to participate in system 100. In some embodiments, when registering to participate in interactive VR system 100, a user may be directed to enroll via other network systems such as Facebook, Google, Apple ID, Android, etc.

At block 308, in some embodiments, a user can link a payment method. A user may link a payment method via a user interface provided by module 304. Module 304 can include a sub-component that establishes connection to a mobile payment network, such as connectivity to mobile payment network block 318. A user may provide a credit card for a payment method. When providing a credit card, a user may be prompted to provide a card number, cardholder name, expiration date, CVV pin, and designate a card nickname. A user may link a bank account to be the user's payment method. When linking a bank account, a user may be prompted to provide identifying information for a banking institution, a bank account number and identifying information for the account holder, and a routing number for the account.

At block 310, in some embodiments, a user can collect virtual rewards. The user may collect virtual rewards within an interactive VR system provided via interactive VR app 122 of system 100. The user may collect virtual rewards via a user interface provided by module 302. Module 302 can include a sub-component for implementing an interactive VR system, such as interactive VR system block 320.

At block 312, in some embodiments, a user can redeem a virtual reward. The user may redeem virtual rewards earned in an interactive VR system provided by an interactive VR application, such as interactive VR app 122 of system 100. The user may redeem a virtual reward via a user interface provided by module 304. Module 304 can include a sub-component for processing reward redemption, such as reward redemption block 322.

In some embodiments, upon redeeming a reward, a user will be prompted to elect to redeem the reward either at a merchant associated with the particular reward, or to the user's digital wallet within interactive VR system. When redeeming a reward at a merchant, as in block 313, the reward may have stipulations set by the merchant. Such stipulations can be, for example, a specified term upon which the reward is valid, a monetary value of the reward, specified purchases that the reward can be used on, etc. When redeeming a reward in the user's digital wallet, as in block 314, the reward may have a lesser valuation in comparison to redeeming the reward for the merchant, as in block 313. For example, a virtual reward corresponding to a particular merchant may have a stipulated reward value that can be redeemed for 100% of the reward value if redeemed at the merchant, but may only be redeemed at some smaller percentage, such as 25% of the reward value, if redeemed into the user's digital wallet. By providing a variable reward value scheme with the highest value being at the time of collection at the merchant location, the interactive VR system encourages users to spend collected rewards immediately rather than storing a reward in the user's digital wallet. Thus, interactive VR system provides a platform for merchants to encourage customers to spend upon visiting their business location.

In some embodiments, upon redeeming a reward, a user may be offered an alternative reward that the user can select instead of redeeming the reward at the merchant or redeeming the reward to the user's digital wallet, as in block 313 or block 314, respectively. For instance, a merchant may offer free or discounted apparel or another physical item that the user may select in lieu of redeeming the reward to their digital wallet.

Figure 4:
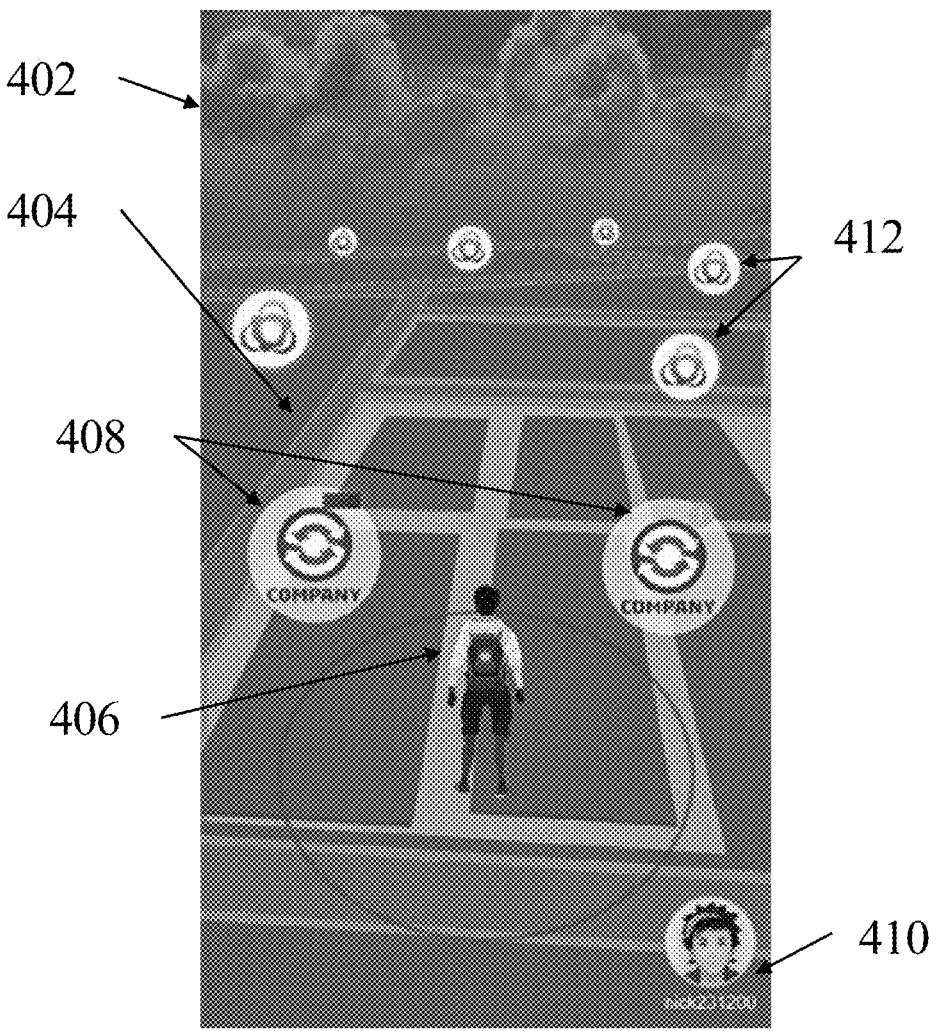
FIG. 4 depicts an exemplary VR map user interface that may be displayed to a user, in accordance with some embodiments.

FIG. 4 depicts an exemplary VR map user interface 400 that may be displayed to a user, in accordance with some embodiments. The user interface may be displayed within an interactive VR application implemented by an interactive VR program, such as interactive VR app 122 implemented by interactive VR program 108 of system 100. As shown, VR map user interface 400 includes a display window 402 that can be used to display an interactive map and various other aspects of the interactive VR system such as avatar 406, merchant-specific reward icons 408, general reward icons 412, and user identifying information 410. In some embodiments, VR map user interface 400 can include a menu for accessing game settings or for navigating to an alternate user interface.

As shown in FIG. 4, the reward icons are depicted as circular icons. It should be appreciated however, that the reward icons can be any number of shapes, such as triangular, rectangular, octagonal, and square, etc. Additionally, the colors of VR map user interface 400 are provided for example only, and the color of a particular avatar, reward icon, or interactive map, respectively, can be one of any number of colors.

In some embodiments, display window 402 can also include billboard advertisement icons. Billboard advertisement icons can be located at random locations within the VR map or at specific locations selected by a merchant or a system administrator. Billboard advertisement icons can correspond to a general reward that may be redeemed at any participating merchant. For example, the system administrator may offer a general reward that can be collected by a user and then redeemed at any participating merchant. In a non-limiting example, the system administrator may offer a general reward outside of a mall that can be redeemed at a participating merchant within the mall. Alternatively, billboard advertisement icons can correspond to a merchant-specific reward that may be redeemed at any location owned by that merchant. For example, a merchant may offer a merchant-specific billboard reward advertising a new product that can be collected and then redeemed at any one of multiple business locations owned by the merchant. In some embodiments, a billboard advertisement may not have a collectable reward and may solely display a billboard advertisement icon for a specific merchant. Billboard advertisement icons may, in some embodiments, be identified by an icon that is a different shape and/or color than reward icons displayed in the VR map.

In further embodiments, the billboard advertisement icons can correspond to intermittent rewards awarded pursuant to intermittent reinforcement principles. In one or more embodiments, the geolocation associated with the intermittent reward can be a location specified by the system administrator and/or can be a location selected and sponsored by a merchant. The intermittent reward can be awarded by the system administrator and/or by a given merchant. Intermittent reinforcement principles can include variable ratio reinforcement, variable amounts, a ratio schedule, and/or an interval schedule. Variable ratio reinforcement can include awarding an intermittent reward randomly and/or intermittently based on geolocation, with the goal being to create behavioral reinforcement and encourage users to repeatedly visit a particular location. Similarly, awarding a reward that can have a variable amount will prevent users from predicting the amount they may collect if an intermittent reward is awarded and thereby encourage users to engage in behavior they believe may lead to a reward in case they might receive a large reward. The intermittent reward can be awarded pursuant to a ratio schedule wherein a specified number of responses are required before the reward will be awarded. The specified number may be a fixed number or it may vary. In some embodiments, the intermittent reward can be awarded pursuant to an interval schedule. That is, the intermittent reward can be awarded after a certain period of time after the last award. For example, an intermittent reward may be awarded every two months. This period of time may be fixed, or it may be variable. Beneficially, by preventing users from predicting the conditions which will lead to an intermittent reward being awarded or the amount of a potential intermittent reward, the system can encourage users to continue exploring to increase their chances of being awarded an intermittent reward.

As shown in FIG. 4, in some embodiments, display window 402 can include two versions of reward icons: merchant-specific reward icon 408 and general reward icon 412. A general reward icon may transform into a merchant-specific reward icon as a user enters a specified proximity around a geolocation associated with the merchant-specific reward icon, thus enabling the user to see what reward a given merchant is offering only by approaching the merchant location. For example, a user may initially see only general icons within display window 402, but upon the user physically approaching the real world geolocations associated with the some of the general reward icons and avatar 406 moving within the interactive map contemporaneously with the user's movement in the real world, the general reward icons will transform into merchant-specific reward icons for a specific merchant that is offering a reward at that particular geolocation.

In some embodiments, a user can select a merchant-specific reward icon displayed on VR map user interface 400 to view reward information for that specific icon. A user can select a merchant-specific reward icon, for example, by tapping on the screen of their device, swiping on the screen of their device, using an auxiliary device such as a mouse with a pointer, etc. Reward information for a specific merchant-specific reward icon can include, for example, instructions for how a user can collect the reward, reward monetary value, reward type, expiration date, etc.

Interactive VR Program

Figure 5:
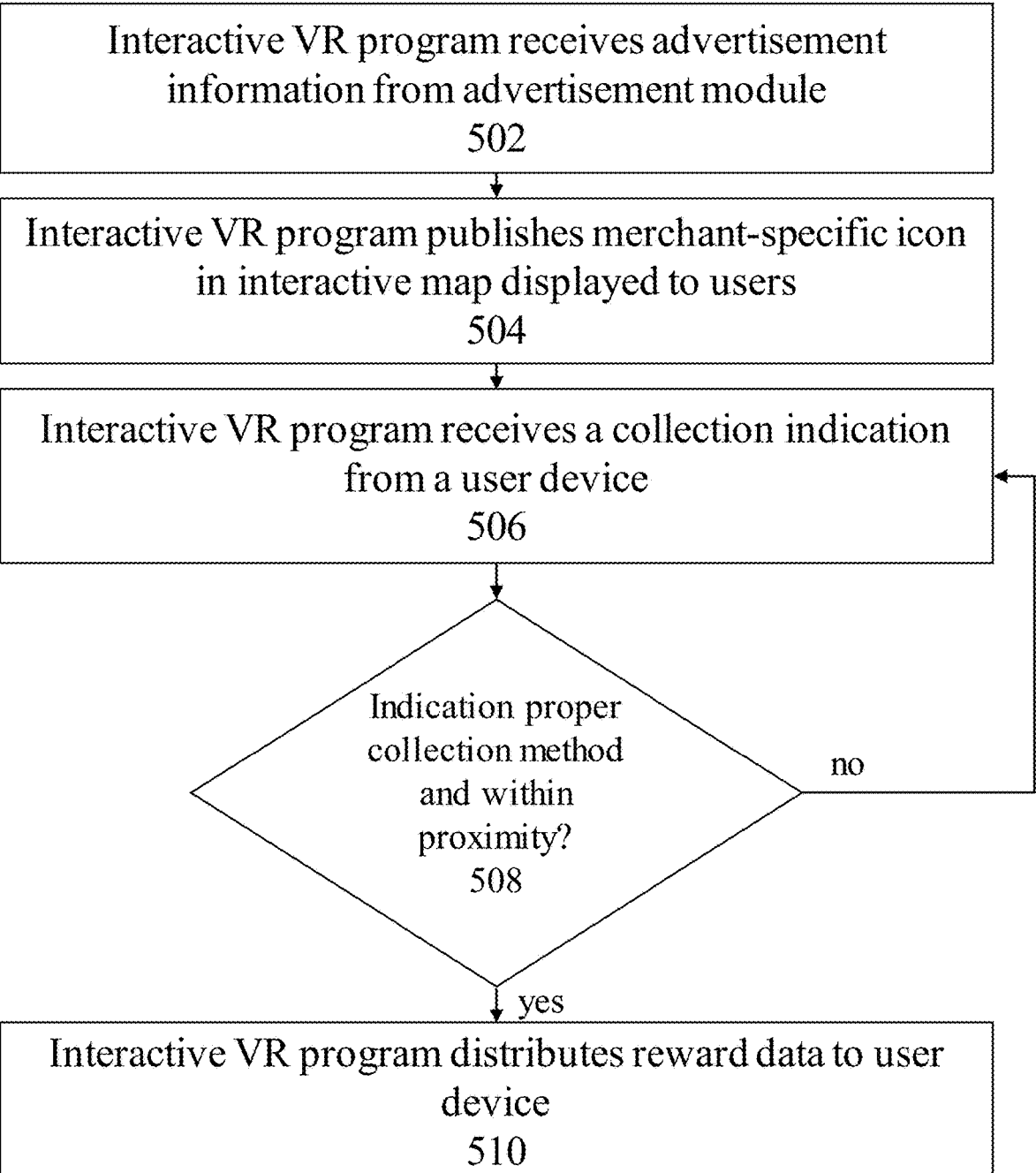
FIG. 5 depicts a flow diagram illustrating an exemplary operation of an interactive VR program, in accordance with some embodiments.

FIG. 5 depicts a flow diagram illustrating an exemplary operation of interactive VR program 108 of system 100. At block 502, interactive VR system module 111 receives advertisement information from advertisement module 110. The advertisement information may include a merchant campaign icon, a geolocation with coordinates for the icon to be displayed within an interactive map, and reward information such as instructions for how a user can collect the reward, reward monetary value, reward type, expiration date, etc.

At block 504, in some embodiments, interactive VR program 108 can publish a merchant-specific reward icon to be displayed in an interactive map displayed on one or more user devices by an interactive VR app such as interactive VR app 122. In some embodiments, the merchant-specific reward icon may appear as a general reward icon until a given user approaches the geolocation of the merchant-specific reward to transform the icon from a general reward icon to a merchant-specific icon.

At block 506, in some embodiments, interactive VR program 108 can receive a collection indication from a user. Interactive VR program 108 can receive a collection indication from a user device such as user device 120. The collection indication may include a confirmation that a user has scanned a quick response (QR) code at a specified location using their user device. The collection indication may include the user performing some action on their user device while physically located in a specific location. For example, the user can tap and hold a collect "button" on the screen of their user device while located inside of a merchant's business location. In some embodiments, the indication can occur immediately when the user is located in a specified geolocation. For example, the specified location may have a global positioning system (GPS) beacon and the user device may automatically send the collection indication to interactive VR program 108 upon being within a specified proximity of the beacon. Alternatively, the collection indication may include a confirmation that a user has scanned a radio frequency identification (RFID) tag at a specified location using their user device.

At step 508, in some embodiments, interactive VR program 108 can verify whether the collection indication received is the proper method and occurred within a specified proximity to a geolocation. The proper method for collection can be determined by the respective merchant who launched a given campaign. In some embodiments, the merchant may specify the proximity radius within which the user must be when their user device sends the collection indication. For example, a merchant can specify that a given reward must be collected by a user scanning a QR code on a physical counter in a brick-and-mortar business location. If interactive VR program 108 determines that either the indication is not the proper method or that a collection indication was not sent from the user device while the user device was within the specified proximity, interactive VR program 108 may deny the collection. If interactive VR program 108 determines that both the indication is the proper method and was sent from the user device within the specified proximity, interactive VR program 108 can approve the collection.

At block 510, in some embodiments, interactive VR program 108 can distribute reward data to the user device. According to some embodiments, the reward data can include information corresponding to a digital unit corresponding to real-world currency. The reward data may include information corresponding to a coupon that can be used at a real-world merchant corresponding to the merchant-specific reward being redeemed.

In some embodiments, interactive VR program 108 will cause a reward notification to be displayed on a user interface of a user's device. The reward notification can be a congratulations screen. The congratulations screen may include information relating to the value of the reward being collected. The congratulations screen may include an option for the user to click an area of the screen to view all reward options available. In some embodiments, the reward notification will prompt the user to select to either: (1) redeem the reward at the real-world merchant corresponding to the merchant-specific reward being collected, or (2) redeem the reward to the user's digital wallet. The reward notification may indicate that if the user redeems the reward at the real-world merchant, the user will receive 100% of the value of the reward, but if the user redeems the reward to the user's digital wallet, the user will receive some lesser percentage of the value of the reward. For example, the reward notification may indicate an option for the user to redeem a reward of $5 at the merchant or redeem a reward of $1.75 to the user's digital wallet. Where the reward is a coupon for a merchant, for example, the reward notification may indicate an option for the user to redeem a coupon reward of $5 usable at that merchant or redeem a coupon reward of $1.75 usable at any participating merchant within the system.

In some embodiments, where the reward data includes information corresponding to a digital unit corresponding to real-world currency, advertisement module 110 can cause an account balance of the merchant account corresponding to the reward being redeemed to decrease according to the digital unit value. Advertisement module 110 may cause a campaign balance of a specific advertisement campaign to decrease according to the digital unit value being redeemed. Reward module 112 may cause a digital wallet balance of the user that is redeeming the reward to increase according to the digital unit value.

In some embodiments, where the reward data includes information corresponding to a coupon that can be used at a real-world merchant corresponding to the merchant-specific reward being redeemed, advertisement module 110 may cause an account balance of the merchant account corresponding to the reward being redeemed to decrease according to the coupon value. Advertisement module 110 may cause a campaign balance of a specific advertisement campaign to decrease according to the coupon value being redeemed. In some embodiments, reward module 112 can cause a digital wallet of the user that is redeeming the reward to add the coupon to the digital wallet.

According to some embodiments, advertisement module 110, may award an additional reward after a user redeems a merchant-specific reward. Advertisement module 110 may award an additional reward if the user immediately makes a purchase at the merchant corresponding to the reward that was redeemed. For example, a user may redeem a merchant-specific reward that includes a digital unit worth $5 real world currency, and the user may receive a notification that if they immediately make a purchase at the merchant using the $5 reward, they will receive a future reward that can be redeemed at the same merchant. The future reward may be redeemable at one any participating merchants within the system. For example, upon making a purchase using the $5 reward, the user may receive a 10% off coupon redeemable at the same merchant or at any participating merchant.

Reward Wallet Module

In some embodiments, reward wallet module 112 can manage rewards users earn or collect and redeem in interactive VR app 122 using a digital wallet. The digital wallet can store merchant-specific rewards collected by users in the interactive VR map. In some embodiments, the digital wallet can store coupon rewards from merchant-specific rewards collected and redeemed by a user in a digital coupon wallet. For example, the digital coupon wallet can store one or more reward codes and/or QR codes that corresponds to a respective merchant-specific reward that was collected and redeemed.

According to some embodiments, the digital wallet can include a digital unit wallet to store digital units from merchant-specific rewards that were collected and redeemed by a user via interactive VR app 122. In some embodiments, digital units stored in the digital unit wallet are not usable until the digital units have been converted. Digital units can be converted into, for example, real-world currency, mobile minutes for a specified phone carrier, a digital coupon or offer for a specified merchant, etc. For example, a user may earn digital units corresponding to real-world currency, but the user cannot use the real-world currency until the user has converted the digital units into real-world currency. Beneficially, by awarding rewards subject to a vesting period, users will be motivated to continue using the application to prevent leaving earned rewards unused. Accordingly, the vesting period aids user retention and participation in the system.

In some embodiments, conversion of digital units is subject to the digital units completing a specified vesting schedule. For example, digital units may vest incrementally over a specified period of time wherein one third of the digital units vest at a first time, another third of the digital units vest at a second time, and a third and final third of the units vest at a third time. Upon completing a vesting schedule a user may be prompted to convert the units. Alternatively, digital units may convert automatically upon completion of a corresponding vesting schedule.

In some embodiments, the reward type can be a digital unit corresponding to real-world currency. If the user redeems the digital unit, the user's digital wallet may be increased by the specified value of the digital unit simultaneously with a deduction from a merchant account corresponding to the virtual reward being redeemed. The reward type may be a coupon that can be used at a real-world merchant corresponding to the virtual reward being redeemed. In some embodiments, the coupon is redeemable only at that merchant. Where the reward is a coupon, the coupon may include a reward code. Upon redeeming a coupon, the user may receive a reward code, a generation date of the reward code, and an expiration date for the reward code. For example, the user may receive a reward code that gives the user 30% off specified purchases during a specified period. Alternatively, a coupon may include a QR code for a merchant to scan.

According to some embodiments, the user can elect to store a coupon to their digital wallet to be used at other participating merchants within an interactive VR system. In some embodiments, if a user elects to store a value of the coupon, the value of the coupon will be reduced compared to the value of the coupon if the user elected to use it at the merchant corresponding to the virtual reward being redeemed. In some embodiments, the reward type may be a reward limited to a specified period. Alternatively, the reward may vary in value over time. For example, if used within a first period, the reward may have a 100% value, if used within a second period after the first period, the reward may have an 80% value, and so on.

In some embodiments, reward wallet module 112 may cause a user to receive a bonus reward. The bonus reward may be awarded by a merchant pursuant to an advertisement campaign. For example, a merchant may specify that some users who collect a reward by performing the appropriate collection procedure at the specified location will receive a bonus reward in addition to the offered reward. In some embodiments, the bonus reward may be awarded by the system administrator via reward wallet module 112. In non-limiting examples, reward wallet module 112 may award a bonus reward after a user redeems a merchant-specific reward or upon satisfaction of a trigger condition. The trigger condition may occur when the user accumulates digital units equal to a specified value in their user wallet. For example, reward wallet 112 may award a bonus reward upon a user accumulating digital units equal to $100 in the user's digital wallet.

In some embodiments, the bonus reward may be awarded randomly or heuristically. In accordance with Skinnerian box principles, by receiving bonus rewards at unpredictable intervals, users may be motivated to continue actions they believe will result in a bonus reward being awarded. For example, when a user receives a bonus reward after redeeming a reward at a merchant, the user may be motivated to collect and redeem more rewards at that merchant and other participating merchants in order to increase the chances of the user receiving an additional bonus reward. Beneficially, this will increase the user's participation within the system and motivate users to continue collecting rewards, thereby increasing foot traffic to merchant locations. Additionally, users may perceive bonus rewards as a "windfall" and thus be more motivated to spend them immediately. In some embodiments, when a bonus reward is awarded to a user, the reward can include a share link that enables the user to share that they have received a bonus reward to one or more of the user's social media platforms. Beneficially, a user sharing such bonus reward may motivate other users to join the system and act as an advertising method for the system to gain additional users.

In some embodiments, a user may receive a bonus zone reward after visiting a specified number of locations within a predefined area. The bonus zone reward may be offered and distributed by the system administrator. Alternatively, the bonus zone reward may be offered, in non-limiting examples, by a single merchant, a group of merchants, an entity that owns multiple merchant locations, or an entity that owns area leased by multiple merchants. For example, after a user collects a specific number of rewards in a mall, the user may receive a bonus zone reward from the mall owner. Alternatively, the user may receive a bonus zone reward from a franchise owner after visiting multiple locations of the franchise. In some embodiments, the bonus zone reward may be awarded pursuant to a scavenger hunt-type game. For example, the user may collect rewards at specified locations and with each reward collected also earn a game piece; upon collecting every game piece, the user may receive the bonus zone reward.

In one or more embodiments, the bonus and/or bonus zone rewards may be awarded according to intermittent reinforcement principles, as discussed above with respect to intermittent rewards.

Figure 6:
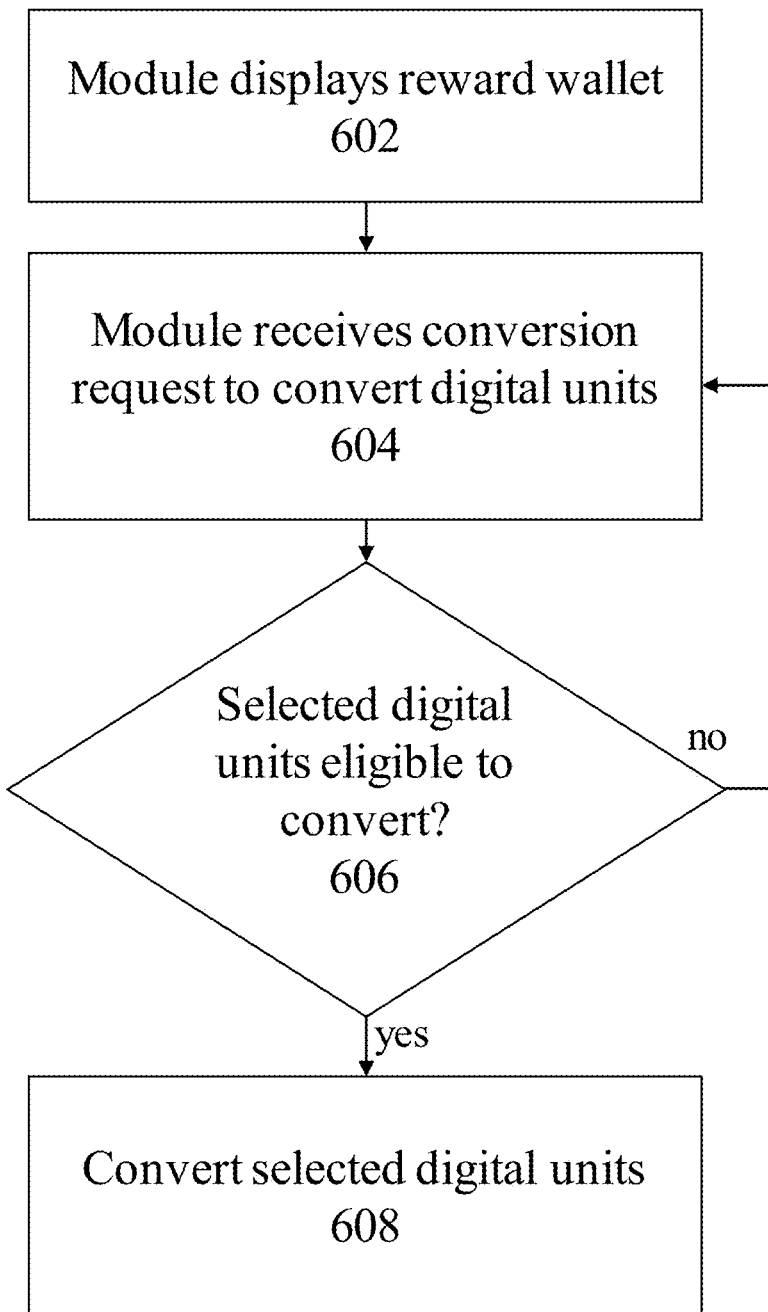
FIG. 6 depicts a flow diagram illustrating an exemplary operation of a reward wallet module of an interactive VR program, in accordance with some embodiments.

FIG. 6 depicts a flow diagram illustrating an exemplary operation 600 of reward wallet module 112 of system 100. Operation 600 may be implemented via reward wallet module 112 of interactive VR program 108 presented to a user via interactive VR app 122 of system 100.

At block 602, in some embodiments, reward wallet module 112 can display a user reward wallet on a user device. The reward wallet may include a summary view of how many digital units a user has earned. The summary view may include a number of digital units collected by a user to date, a vesting schedule for each digital unit or a set of digital units, the total number of digital units available for conversion, the number of vested digital units, etc. In some embodiments, the summary view can include an advertisement banner containing an offer for a specific merchant. The advertisement banner may include an offer for a user to redeem a specified percentage or number of currently un-vested digital units for a specified reward. For example, the advertisement banner may offer to provide a 10% off coupon at the merchant in return for a specified number or percentage of the user's un-vested digital units. Alternatively, the advertisement banner may provide an offer in exchange for a specified number or percentage of the user's vested digital units.

At block 604, in some embodiments, reward wallet module 112 can receive a conversion request from a user to convert digital units in the user's reward wallet. The conversion request may include a request to convert selected digital units into real-world currency. Alternatively, the conversion request may include a request to convert digital units in the user's reward wallet into mobile minutes for a cellular data plan. In some embodiments, reward wallet module 112 may receive the conversion request from interactive VR app 122 on user device 120.

According to some embodiments, upon receiving a conversion request to convert digital units, reward wallet module 112 can provide a bonus reward notification to the user. The bonus reward notification may provide information that the user can receive a bonus number of digital units. In some embodiments, the bonus reward notification will indicate the user can only receive a bonus number of digital units if the user opts to cancel the request to convert the selected digital units. The bonus reward notification may not indicate how many bonus digital units are available unless the user opts to cancel the request to convert the selected digital units.

Figure 7:
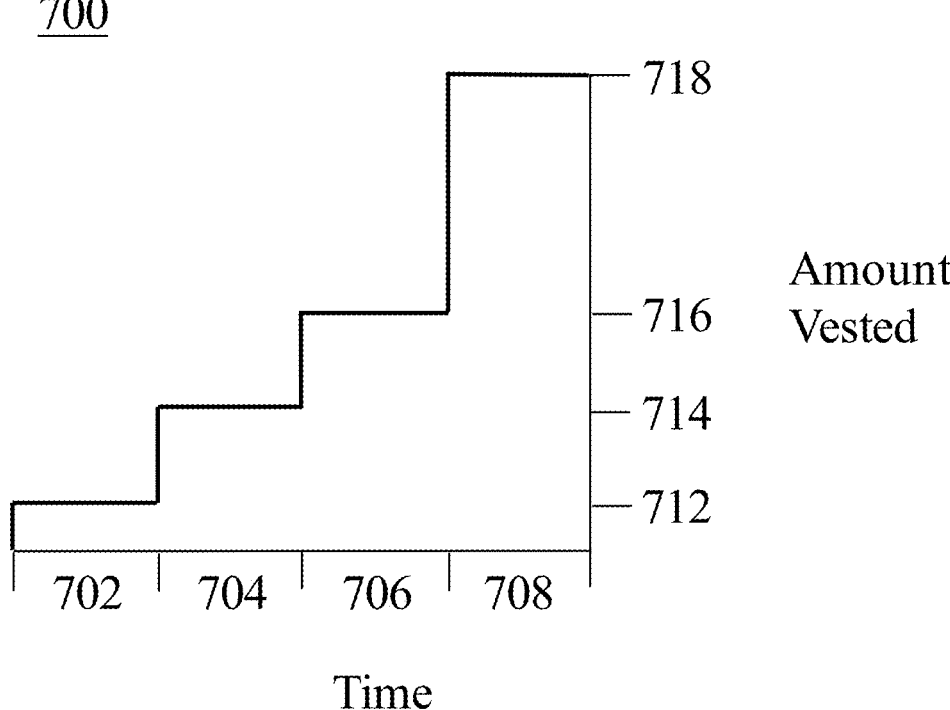
FIG. 7 depicts an exemplary vesting schedule for use in a reward wallet module of an interactive VR program, in accordance with some embodiments.

FIG. 7 depicts an exemplary vesting schedule used by reward wallet module 112 of system 100, according to some embodiments. As shown in FIG. 7, a first amount 712 of a reward may vest and be available during a first period 702, a second amount 714 vested and available during a second period 704, a third amount 716 vested and available during a third period 706, and a fourth amount 718 vested and available during a fourth period 708. For example, a reward may include a digital unit corresponding to real-currency value of $100 subject to a vesting period of 1 year wherein 10% of the reward is available at first period 702, 25% of the reward is available at second period 704, 50% of the reward is available at third period 706, and 100% of the reward is available at fourth period 708.

It should be understood that vesting schedule 700 is provided as an example only, and that various other vesting schedules can be implemented by reward wallet module 112. For example, all or some digital units in a user's reward wallet may vest upon a certain date in the future such as a user's birthday, all or some digital units may vest upon a trigger condition such as completing an education program or participating in a specified event, etc.

In some embodiments, a certain digital unit or group of digital units may be subject to a specified vesting period but then vest prematurely. When digital units vest prematurely, reward wallet module 112 may display a bonus vesting screen to a user on user device 120. The bonus vesting screen may indicate the specified number of digital units that are prematurely eligible to convert and provide options to a user to select what medium the user wants to convert the units to (e.g., mobile minutes, real-world currency, merchant-specific coupon, etc.) or to delay conversion. In some embodiments, if the user elects to delay conversion, the user may receive a bonus award of digital units.

Referring back to FIG. 6, at step 606, in some embodiments, reward wallet module 112 can verify whether selected digital units in a user's conversion request are eligible to convert. Reward wallet module 112 can perform such verification using data stored in VR application database 106 for the specified user. Reward wallet module 112 may determine that selected digital units are not eligible to convert and may send the user an error message. The error message may provide information indicating that the user's request failed and display the time period remaining until the digital units are available to vest. Alternatively, reward wallet module 112 may determine that selected digital units are eligible to convert and may send the user a confirmation message. The confirmation message may provide information indicating that the user's request was approved and confirmation that the selected digital units were converted.

At block 608, in some embodiments, reward wallet module 112 can convert selected digital units to real-world currency. Alternatively, reward wallet module 112 may convert selected digital units to mobile minutes. Upon converting selected digital units in accordance with a user's conversion request, reward wallet module 112 can provide an updated summary view screen indicating that the corresponding decrease in vested digital units in the user's reward wallet. Upon converting digital units into real-world currency, reward wallet module 112 may immediately transfer the real-world currency to a linked bank account of the user. In some embodiments, upon converting digital units into real-world currency, reward wallet module 112 can immediately transfer the real-world currency to a digital currency wallet displayed on another screen in interactive VR app 122.

According to some embodiments, interactive VR program 108 can include a digital currency wallet for a specific user. Interactive VR program 108 can interface with online banking, internet-cloud-based financial systems, or other mobile-based payment systems thereby enabling interactive VR program 108 to perform specified operations with respect to digital funds corresponding to a user using interactive VR app 122. Specified operations can include transferring funds, and/or spending funds. In some embodiments, interactive VR program 108 can enable a user to transfer digital funds to a linked bank account corresponding to the user. Alternatively, interactive VR program 108 may enable a user to transfer digital funds to other users within system 100 upon a command by the user to transfer a specified amount to a specified user.

Interactive VR app 122 can, in some embodiments, enable a user to spend digital funds stored in the digital currency wallet at a participating merchant within the system 100. Interactive VR app 122 may enable a user to spend funds at a merchant using a QR code that the merchant can scan to receive payment. Alternatively, interactive VR app 122 may enable a user to spend funds at a merchant using a near-field communication (NFC) or Bluetooth communications between user device 120 and a co-acting NFC device, beacon, or Bluetooth computer system of the merchant.

Education System Sub-Module

According to some embodiments, reward wallet module 112 includes a sub-module for implementing an educational award system within an interactive VR system. Alternatively, the educational award system sub-module may be a standalone module within the interactive VR system that is not a sub-module of the reward wallet module 112. The digital unit wallet of reward wallet module 112 can store digital units corresponding to real-world currency earned by a user via the educational award system. Digital units earned via the educational award system can be subject to similar vesting schedule requirements as discussed above. For example, the educational award system can include questions targeted for a specific grade in school and the rewards earned by a student may vest upon the close of the semester or upon graduation to the next grade. Alternatively, rewards earned may vest pursuant to a similar time-based vesting schedule. According to some embodiments, students can expedite the vesting process by completing extra credit assignments or by performing above a set level on tests. In a non-limiting example, if a student earns a 100% on a given assignment, the vesting schedule of the digital units earned by completing that assignment may vest at half the rate they would have vested otherwise.

In some embodiments, the educational award system can enable educators to create quizzes for students and offer monetary rewards based on student quiz performance. In some embodiments, educators can include a lock feature on a quiz. For example, educators can lock a quiz such that it is only accessible during a specific period or for a specified duration after opening the quiz. In some embodiments, educators can lock additional attempts to answer a given question after a specified number of attempts. For example, the educator may create a test question where the students can attempt to answer the question twice, and offer a reduced reward if answered correctly on the second attempt.

The educational award system can also enable educators to track and reward attendance by enabling students to verify attendance using a check-in feature. To verify attendance, a student may scan a QR code or RFID code at a specified location using the student's user device. For example, each classroom in a school may have a QR code or RFID code located at the entrance to the classroom or on the surface of each desk that students can scan with their user device. Alternatively, the educational award system may have access to a database with stored information that identifies specific class locations with a specific geolocation. The specific class locations may be rooms within a school or assigned remote locations. For example, when a school is conducting remote class sessions, students may be prompted to provide location information for a designated remote learning location.

The educational award system can include an interactive app displayed to students on their user device. In some embodiments, students may be prompted to verify their identity upon opening the interactive app on their user device. For example, students may be prompted to provide a unique student password or provide biometrics such as a fingerprint or self-photograph before any quizzes or check-in features are accessible.

Figure 8:
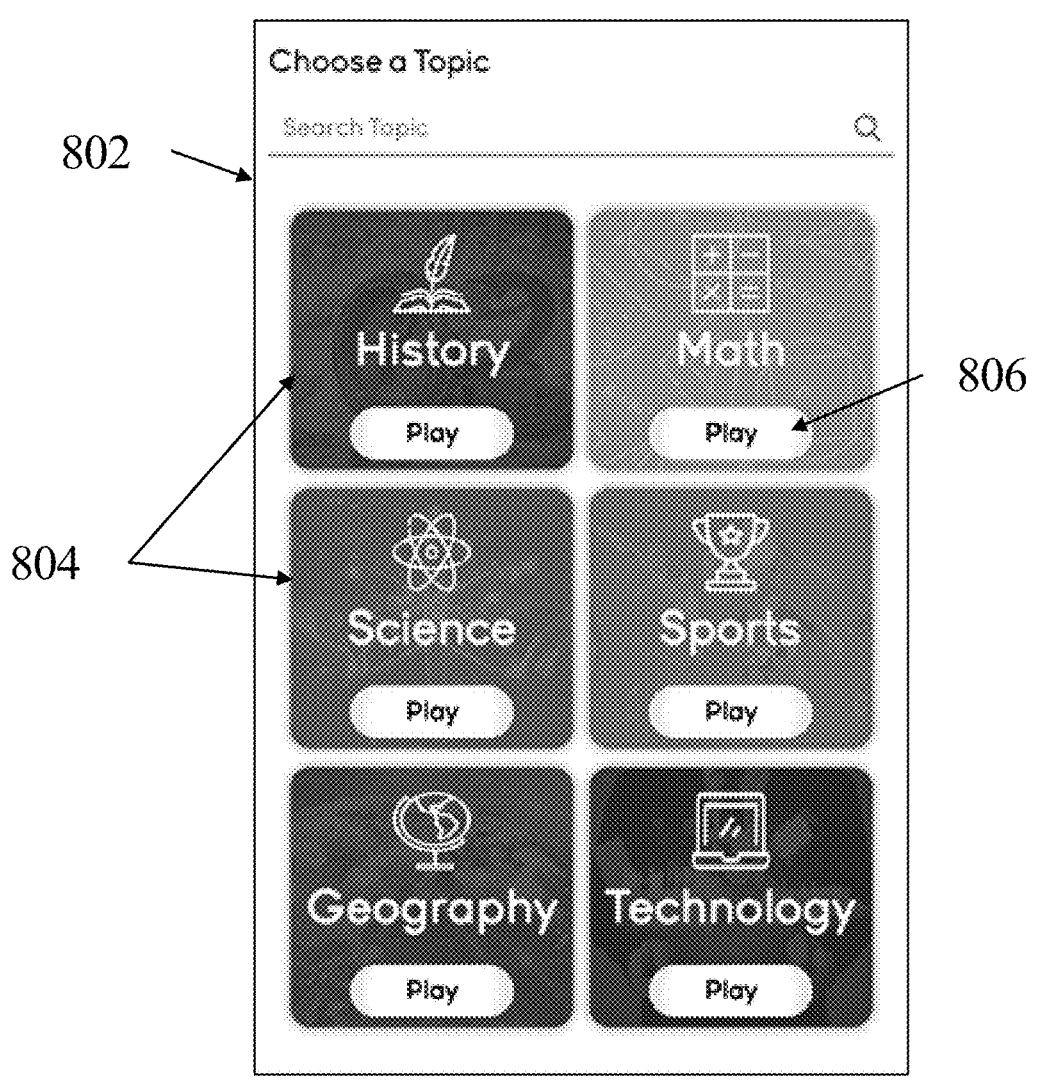
FIG. 8 depicts an exemplary educational quizzes user interface that may be displayed to a user, in accordance with some embodiments.

FIG. 8 depicts an exemplary educational quizzes user interface 800 that may be displayed to a user, in accordance with some embodiments. The educational quizzes user interface 800 may be displayed within an interactive VR application implemented by an interactive VR program, such as VR app 122 implemented by interactive VR program 108 of system 100. As shown, educational quizzes user interface 800 includes a display window 802 that can be used to display one or more available quizzes 804 which can be attempted by selecting selection icon 806.

As shown in FIG. 8, six quizzes 804 are depicted. It should be appreciated, however, that any number of quizzes 804 can be displayed within display window 802. Additionally, although the quizzes shown in FIG. 8 are depicted as subject-specific quizzes, the type of quiz available can include more than just subject categories. For example, the available quizzes 804 can be categorized by date, educator, class title, term of school, etc.

Figure 9:
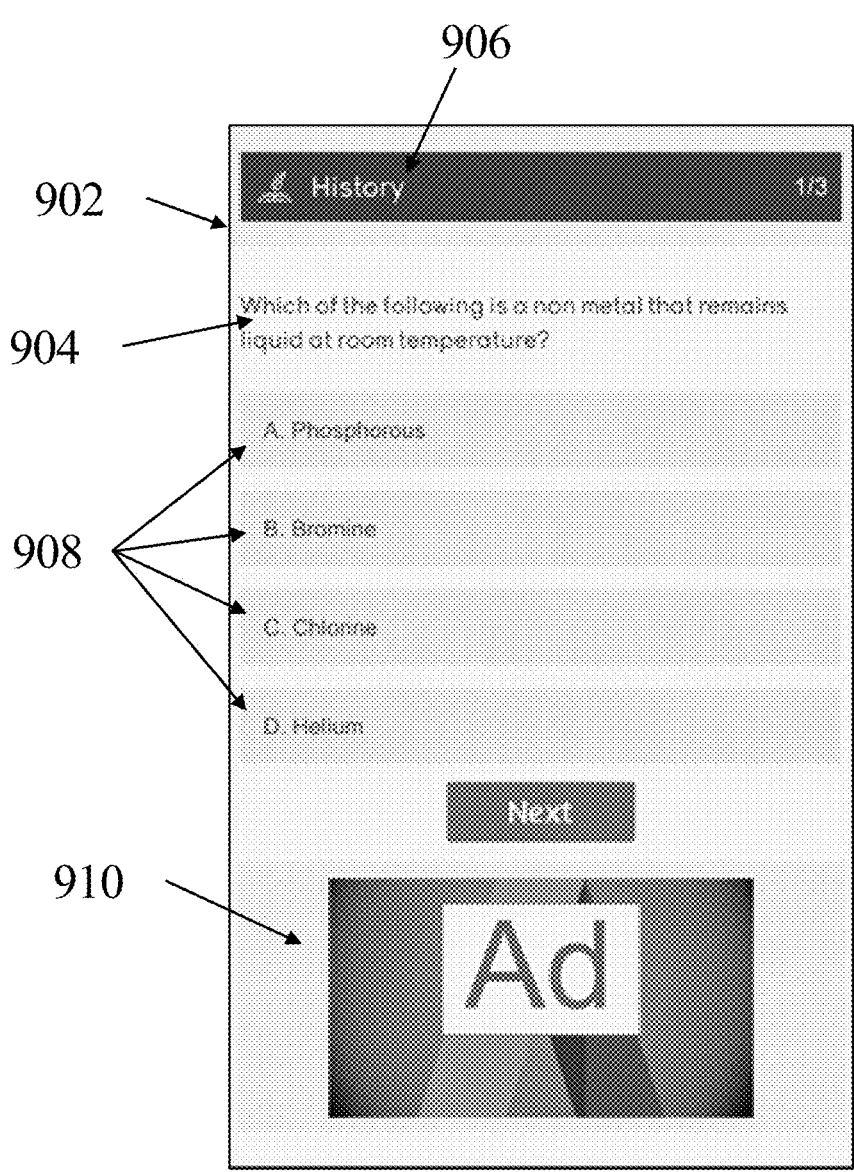
FIG. 9 depicts an exemplary quiz user interface that may be displayed to a user, in accordance with some embodiments.

FIG. 9 depicts an exemplary quiz user interface 900 that may be displayed to a user, in accordance with some embodiments. The quiz user interface 900 may be displayed within an interactive VR application implemented by an interactive VR program, such as VR app 122 implemented by interactive VR program 108 of system 100. As shown, quiz user interface 900 includes a display window 902 that can be used to display a quiz subject 906, quiz question 902, quiz answers 908, and an advertisement 910.

Students can earn rewards with digital units corresponding to real-world currency by correctly answering quiz questions. In some embodiments, students can only earn rewards by selecting the correct answer in a quiz. Alternatively, students may earn partial credit and some portion of a reward even if they do not select the correct answer in a quiz. In some embodiments, in order to earn partial credit, a student may perform an additional task such as watching a custom teaching video and/or performing some extra task set by the educator. Digital units earned by answering quiz questions may automatically be stored in the user's digital unit wallet.

Figure 10:
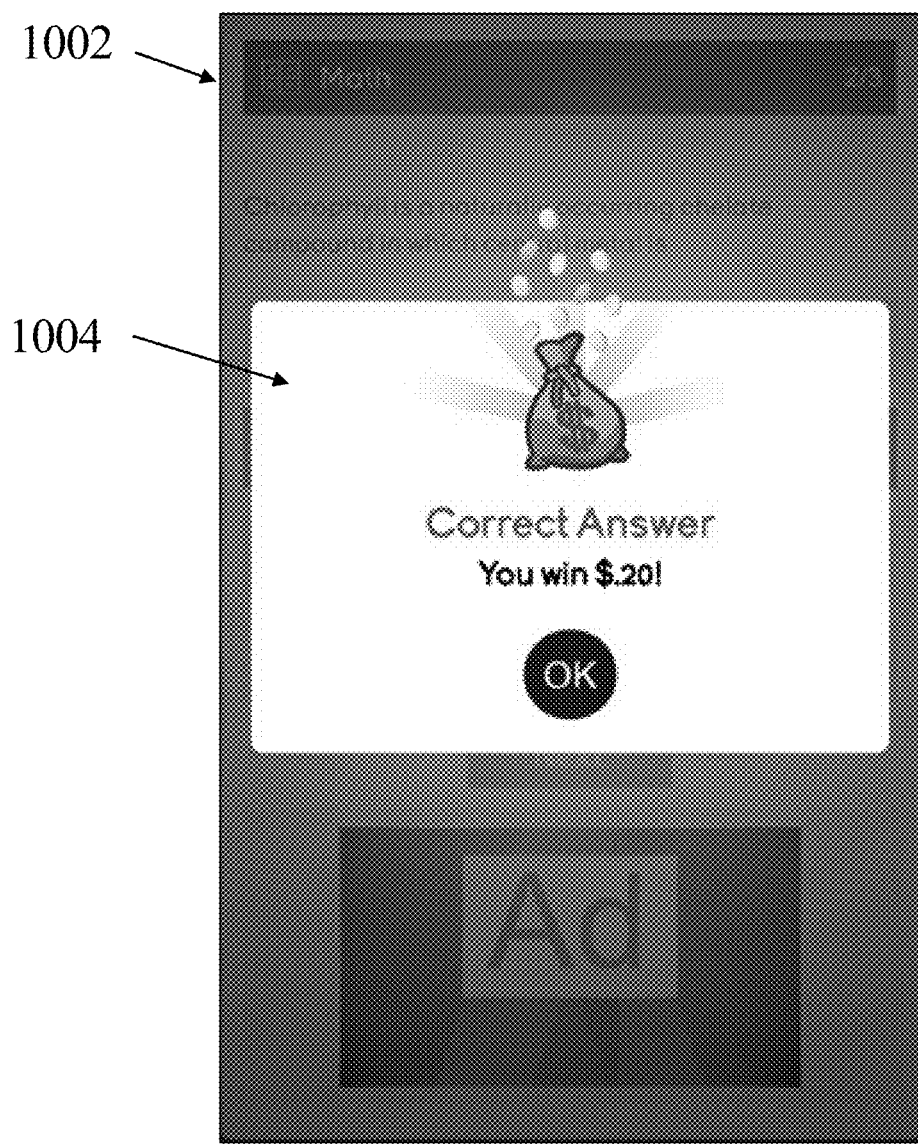
FIG. 10 depicts an exemplary quiz reward user interface that may be displayed to a user, in accordance with some embodiments.

FIG. 10 depicts an exemplary quiz reward user interface 1000 for that may be displayed to a user, in accordance with some embodiments. The quiz user interface 1000 may be displayed within an interactive VR application implemented by an interactive VR program, such as VR app 122 implemented by interactive VR program 108 of system 100. As shown, quiz user interface 1000 includes a display window 10002 that can be used to provide a reward notification 1004 to a student after the student provides a correct answer to a quiz.

According to some embodiments, educators can create and upload teaching videos tailored to specific test questions that are only playable after a student attempts to answer a question. The student may be presented with an option to watch the education video after submitting an answer to a quiz question, and the video may play upon the student's selection of the option to play the video. For example, an educator can create a teaching video that explains why a given answer is correct and the alternative answers are incorrect.

Students can also earn rewards of digital units corresponding to real-world currency by verifying attendance for class sessions. According to some embodiments, students can verify classroom attendance by scanning an RFID or QR code at a classroom location. In some embodiments, once the student's user device is located within a specified proximity of a classroom, their user device may automatically send an attendance verification signal to reward wallet module 112 of interactive VR program 108. Alternatively, the student may manually send a check-in notification using a graphical user interface on their user device to verify attendance.

In some embodiments, rewards for attendance can be offered to users via interactive VR app 122 provided to a user on a user device 120 within system 100. For example, the interactive VR app 122 may have a merchant version and an education version, wherein the education version includes icons displayed at classroom locations that students can interact with using their user device 120. For example, interactive VR app 122 may include an education version of the interactive VR map displayed in FIG. 4 that includes class-specific icons in the geolocation of a given class. The class-specific icons may identify a teacher, a subject, a specific classroom, etc. If a student were to have a geography class at a certain location, for example, the location may be identified by an icon with a globe that the student can select on their user device to check-in for a class period.

In some embodiments, interactive VR app 122 may include quiz icons displayed on the education version of the interactive VR map which are selectable to change the display to a quiz. Interactive VR app 122 may display the class-specific icon on the interactive VR map for the student to verify attendance and thereafter display a quiz icon that the student can select which will cause interactive VR app 122 to display a new display window with a quiz. For example, if a certain quiz is available to students in the first ten minutes of a geography class, interactive VR app 122 may display an interactive map with a geography class-specific icon to verify attendance and thereafter display a quiz icon that prompts the student to start the geography quiz.

Advertiser Quiz Sub-Module

According to some embodiments, reward wallet module 112 includes a sub-module for implementing an advertiser quiz platform within the interactive VR system. Alternatively, the advertiser quiz sub-module may be a standalone module within the interactive VR system that is not a sub-module of the reward wallet module 112. The advertiser quiz platform can operate similarly to the educational award system sub-module. The digital unit wallet of reward wallet module 112 can store digital units corresponding to real-currency earned by users via the advertiser quiz platform. Digital units earned via the advertiser quiz platform can be subject to similar vesting schedule requirements as discussed above.

According to some embodiments, the advertiser quiz platform may include quizzes developed by a system administrator of system 100. In some embodiments, the advertiser quiz platform can include quizzes developed by advertisers. As a non-limiting example, an advertiser may create a quiz about the different flavors of a consumer good the advertiser markets and sells.

In some embodiments, the advertiser quiz platform can enable advertisers to sponsor quizzes created by educators via the educational award system. As shown in FIG. 9, quiz reward user interface 900 can include advertisement 910. Advertisement 910 can be an advertisement for a participating merchant within system 100. Alternatively, advertisement 910 may be an advertisement unrelated to a specific merchant. For example, the advertisement may be for a large consumer brand, a mall with multiple locations, a movie theater chain, a franchise, etc. According to some embodiments, advertisement 910 may be a banner advertisement that contains only information regarding the advertiser. Alternatively, advertisement 910 may be a video advertisement. Users may select an option to watch the video. In some embodiments, selecting to watch the video may provide the user with some benefit. For example, the user may earn an increased reward by watching a video.

Government Distribution System Sub-Module

According to some embodiments, reward wallet module 112 includes a sub-module for implementing a government distribution system within the interactive VR system. Alternatively, the government distribution sub-module may be a standalone module within the interactive VR system that is not a sub-module of the reward wallet module 112. The government distribution system can enable a government entity such as a national government, local government, government department, etc. to distribute real-world currency funds to the digital unit wallet of users of the interactive VR app 122. Beneficially, the government distribution system can improve the ease of distributing funds to users by relying on the digital wallet of users within interactive VR system, which are already linked to user's banking or payment information. In some embodiments, the government distribution system may include safeguards to ensure transactions comply with monetary regulation. Such monetary regulations can include, in non-limiting examples, anti-money laundering laws, income taxes, and tax laws or regulations.

In some embodiments, the government entity can distribute funds only to users within a specific geographical area. For example, the government distribution system can enable a government entity to distribute funds to remote populations without convenient access to banking institutions. Alternatively, the government entity may distribute funds to a specific group of users. For example, the government distribution system may enable a government entity to distribute funds to users located in an area that recently experienced a natural disaster, or to distribute funds to a refugee camp or an organization assisting people within a geographic area.

In some embodiments, the government distribution system may enable a government to distribute funds to merchants. The government distribution system may distribute funds to business locations in a specific area. Alternatively, the government distribution system may disburse funds for small business loans. The government distribution system may facilitate the government entity collecting payments due for such loan.

According to some embodiments, the government entity can disburse funds to specific users based on targeted demographics. Targeted demographics can include, for example, zip code, income, family size, number of dependents, user participation in certain programs, etc. For example, users may enroll in certain training programs and register to be eligible to receive funds distributed through specified government benefit programs. In some embodiments, the government distribution system may enable a government entity to disburse consumer loans to users that request and qualify for such loan. The government distribution system may facilitate the government entity collecting payments due for such loan over time, including interest due.

The government distribution system can, in some embodiments, reward desirable user behavior. For example, the government distribution system may offer rewards for certain behaviors. Such behaviors can include, for example, user participation in community service events, healthcare visits, athletic events, cultural events, etc. To monitor participation and user behavior, the government distribution system can rely on users scanning QR or RFID codes at specified locations with their user device, similarly to system 100 above. For example, where a government entity wants to encourage participation in a community event to pick up garbage in a specific area, the government entity may offer a reward to users that can be collected by users scanning a QR code after dropping a bag of garbage in a specified location. The reward may be offered to users in an interactive VR map displayed to users on a user device 120 within system 100.

For the purpose of clarity and a concise description, features are described herein as part of the same or separate embodiments; however, it will be appreciated that the scope of the disclosure includes embodiments having combinations of all or some of the features described.

Additional Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify presence of stated features, integers, steps, operations, elements, components, and/or units but do not preclude the presence or addition of one or more other features, integers, steps, operations, elements, components, units, and/or groups thereof.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Following is a list of enumerated embodiments.

Embodiment 1. A virtual rewards method using an interactive virtual reality system comprising:

transmitting virtual reality data to a user device, the virtual reality data corresponding to a map that includes a user location corresponding to a location of the user device within the map and an avatar position corresponding to the user location, the avatar position updating as the user location updates;

transmitting reward location data to the user device, the reward location data corresponding to a plurality of virtual reward locations located within the map wherein each virtual reward location within a predetermined proximity of the avatar position is identified with a specific reward icon and each virtual reward location outside the predetermined proximity is identified with a general reward icon;

receiving from the user device an indication that the user has collected a virtual reward at a first virtual reward location;

transmitting notification data to the user device, the notification data showing that the user has collected the virtual reward; and transmitting reward data to the user device, the reward data corresponding to the virtual reward for the first virtual reward location.

Embodiment 2. The method of embodiment 1, wherein the reward data includes a first option and a second option and the method further comprises receiving from the user device a selection of either the first option or the second option.

Embodiment 3. The method of embodiment 2, wherein the first option enables a user to redeem a full-value reward usable at a specific real-world merchant and the second option enables a user to redeem a lesser-value digital unit that can be stored in a digital wallet.

Embodiment 4. The method of embodiment 1, wherein the specific reward icon is a merchant-specific icon corresponding to a real-world merchant offering a reward at the virtual reward location identified by the specific reward icon.

Embodiment 5. The method of embodiment 4, wherein when the avatar position is within a predetermined proximity of a first virtual reward location and a second virtual reward location, the specific reward icon identifying each of the first virtual reward location and the second virtual reward location is a unique merchant-specific icon corresponding to different real-world merchants.

Embodiment 6. The method of embodiment 1, wherein receiving the indication from the user device occurs automatically when the user device scans a QR code at a real-world location corresponding to the first virtual reward location.

Embodiment 7. The method of embodiment 1, wherein receiving the indication from the user device occurs automatically when the user device scans an RFID tag at a real-world location corresponding to the first virtual reward location.

Embodiment 8. The method of embodiment 1, wherein receiving the indication from the user device occurs automatically when the user location is within a predetermined distance of a GPS beacon located at a real-world location corresponding to the first virtual reward location.

Embodiment 9. The method of embodiment 1, wherein the virtual reward can only be used within a predetermined time after transmitting the reward data.

Embodiment 10. The method of embodiment 1, wherein the virtual reward is a digital unit that can be used at a real-world merchant corresponding to the first virtual reward location.

Embodiment 11. The method of embodiment 10, wherein the digital unit can only be used at the real-world merchant within a predetermined time after transmitting the reward data.

Embodiment 12. The method of embodiment 11, further comprising transmitting command data to the user device, the command data containing instructions to remove the first virtual reward location from the map when a predetermined number of rewards for the first virtual reward location have been collected.

Embodiment 13. The method of embodiment 11, wherein the real-world merchant pays a fee when the virtual reward is collected at a virtual location corresponding to the real-world merchant.

Embodiment 14. The method of embodiment 1, further comprising transmitting bonus reward data to the user device, the bonus reward data being transmitted randomly.

Embodiment 15. The method of embodiment 1, wherein the virtual reward is a digital unit that corresponds to a real-world currency.

Embodiment 16. The method of embodiment 15, further comprising, after receiving a first user command, converting the digital unit to the real-world currency; and transmitting currency data to the user device, the currency data corresponding to the real-world currency value of the digital unit.

Embodiment 17. The method of embodiment 16, further comprising, after receiving a second user command, transferring the real-world currency value of the converted digital unit to a bank account.

Embodiment 18. The method of embodiment 16, wherein converting the digital unit to real-world currency cannot occur until after completion of a vesting schedule.

Embodiment 19. The method of embodiment 18, wherein completion of the vesting schedule requires allowing a predetermined period of time to pass after transmitting the reward data.

Embodiment 20. A non-transitory machine readable medium storing instructions that, when executed by at least one processor of a computing device, cause the device to perform operations comprising:

transmitting virtual reality data to a user device, the virtual reality data corresponding to a map that includes a user location corresponding to a location of the user device within the map and an avatar position corresponding to the user location, the avatar position updating as the user location updates;

transmitting reward location data to the user device, the reward location data corresponding to a plurality of virtual reward locations located within the map wherein each virtual reward location within a predetermined proximity of the avatar position is identified with a specific reward icon and each virtual reward location outside the predetermined proximity is identified with a general reward icon;

receiving from the user device an indication that the user has collected a virtual reward at a first virtual reward location;

transmitting notification data to the user device, the notification data showing that the user has collected the virtual reward; and transmitting reward data to the user device, the reward data corresponding to the virtual reward for the first virtual reward location.

Embodiment 21. An interactive virtual reality system comprising:

one or more processors coupled to one or more memory devices, wherein the one or more memory devices include instructions that when executed by the one or more processors cause the system to:

transmit virtual reality data to a user device, the virtual reality data corresponding to a map that includes a user location corresponding to a location of the user device within the map and an avatar position corresponding to the user location, the avatar position updating as the user location updates;

transmit reward location data to the user device, the reward location data corresponding to a plurality of virtual reward locations located within the map wherein each virtual reward location within a predetermined proximity of the avatar position is identified with a specific reward icon and each virtual reward location outside the predetermined proximity is identified with a general reward icon;

in response to receiving an indication from the user device, transmit notification data to the user device, the notification data showing that the user has collected a virtual reward at a first virtual reward location, and transmit reward data to the user device, the reward data corresponding to the virtual reward for the first virtual reward location.

Embodiment 22. A method for receiving location-based rewards on a user device in an interactive virtual reality system comprising:

displaying, on a user device, a map corresponding to the user's location and a virtual avatar within the map, the virtual avatar having an avatar position indicating the user's location within the map;

displaying, within the map, one or more virtual reward locations wherein each virtual reward location within a predetermined proximity of the avatar position identified with a merchant-specific icon and each virtual reward location outside the predetermined proximity identified with a general reward icon;

displaying a notification that the user has collected a virtual reward when the user provides an indication that they have moved to a first virtual reward location; and receiving reward data corresponding to the virtual reward for the first virtual reward location.

Embodiment 23. The method for receiving location-based rewards of embodiment 22, wherein the reward data includes a first option and a second option and the method further comprises transmitting the user's selection of either the first option or the second option to an administrator server.

Embodiment 24. The method for receiving location-based rewards of embodiment 23, wherein the first option enables a user to redeem a full-value reward usable at a specific real-world merchant and the second option enables a user to redeem a lesser-value digital unit that can be stored in a digital wallet.

Embodiment 25. The method for receiving location-based rewards of embodiment 22, wherein the specific reward icon is a merchant-specific icon corresponding to a real-world merchant offering a reward at the virtual reward location identified by the specific reward icon.

Embodiment 26. The method for receiving location-based rewards of embodiment 25, wherein when the avatar position is within the predetermined proximity of a first virtual reward location and a second virtual reward location, the specific reward icon identifying each of the first virtual reward location and the second virtual reward location is a unique merchant-specific icon corresponding to different real-world merchants.

Embodiment 27. The method for receiving location-based rewards of embodiment 22, wherein the indication comprises scanning a quick response (QR) code at a real-world location corresponding to the virtual location with the user device.

Embodiment 28. The method for receiving location-based rewards of embodiment 22, wherein the indication comprises scanning a radio frequency identification (RFID) tag at a real-world location corresponding to the first virtual reward with the user device.

Embodiment 29. The method for receiving location-based rewards of embodiment 22, wherein the indication occurs automatically when the user device is located within a predetermined distance of a global positioning system (GPS) beacon located at a real-world location corresponding to the first virtual reward location.

Embodiment 30. The method for receiving location-based rewards of embodiment 22, further comprising storing the reward data in a digital wallet on the user device.

Embodiment 31. The method for receiving location-based rewards of embodiment 22, wherein the reward data includes a digital unit that corresponds to real-world currency.

Embodiment 32. The method for receiving location-based rewards of embodiment 22, wherein the reward data includes a digital unit that can be used at a real-world merchant corresponding to the first virtual reward location.

Embodiment 33. The method for receiving location-based rewards of embodiment 32, wherein the digital unit is only usable within a predetermined time after receiving the reward data.

Embodiment 34. The method for receiving location-based rewards of embodiment 22, further comprising receiving data that indicates the first virtual reward location no longer has any virtual rewards available; and removing the first virtual reward location from the displayed map.

Embodiment 35. The method for receiving location-based rewards of embodiment 31, further comprising receiving a first user command to convert the digital unit to real-world currency and displaying data corresponding to the real-world currency value of the digital unit after it is converted.

Embodiment 36. The method for receiving location-based rewards of embodiment 35, further comprising receiving a second user command to transfer the real-world currency value of the digital unit to the user's bank account.

Embodiment 37. The method for receiving location-based rewards of embodiment 35, wherein the user can command to convert the digital unit to real-world currency only after completion of a vesting schedule.

Embodiment 38. The method for receiving location-based rewards of embodiment 37, wherein completion of the vesting schedule requires allowing a predetermined period of time to pass after receiving the reward data.

Embodiment 39. A non-transitory machine readable medium storing instructions that, when executed by at least one processor of a computing device, cause the device to perform operations comprising:

displaying, on a user device, a map corresponding to the user's location and a virtual avatar within the map, the virtual avatar having an avatar position indicating the user's location within the map;

displaying, within the map, one or more virtual reward locations wherein each virtual reward location within a predetermined proximity of the avatar position identified with a merchant-specific icon and each virtual reward location outside the predetermined proximity identified with a general reward icon;

displaying a notification that the user has collected a virtual reward when the user provides an indication that they have moved to a first virtual reward location; and receiving reward data corresponding to the virtual reward for the first virtual reward location.

Embodiment 40. An interactive virtual reality system comprising:

one or more processors coupled to one or more memory devices, wherein the one or more memory devices include instructions that when executed by the one or more processors cause the system to:

display, on a user device, a map corresponding to the user's location and a virtual avatar within the map, the virtual avatar having an avatar position indicating the user's location within the map;

display, within the map, one or more virtual reward locations wherein each virtual reward location within a predetermined proximity of the avatar position identified with a merchant-specific icon and each virtual reward location outside the predetermined proximity identified with a general reward icon;

display a notification that the user has collected a virtual reward when the user provides an indication that they have moved to a first virtual reward location; and receive reward data corresponding to the virtual reward for the first virtual reward location.

Embodiment 41. A computer-based system for transmitting virtual education rewards, the computer-based system comprising:

one or more processors coupled to one or more memory devices, wherein the one or more memory devices include instructions that when executed by the one or more processors cause the system to:

transmit quiz data to a user's device, the quiz data including one or more quiz questions with selectable answers, wherein one of the selectable answers is a correct answer;

in response to receiving an answer selection from the user device indicating that the user selected one of the selectable answers:

transmit notification data to the user's device, the notification data showing that the user was correct if the user selected the correct answer or that the user was incorrect if the user did not select the correct answer; and if the user selected the correct answer, transmitting reward data to the user's device, the reward data corresponding to a virtual education reward.

Embodiment 42. The computer-based system of embodiment 56, wherein the processor is further configured to:

transmit virtual reality data to the user's device, the virtual reality data corresponding to a map that includes a user location corresponding to the user device's location within the map and an avatar position corresponding to the user location, the avatar position updating as the user location updates;

transmit check-in location data to the user's device, the check-in location data corresponding to one or more virtual check-in locations located within the map corresponding to a check-in location wherein the user can verify their attendance to an event;

in response to receiving a check-in indication from the user device:

transmit notification data to the user's device, the notification data showing that the user has checked in at a first virtual check-in location, and transmit reward data to the user's device, the reward data corresponding to a virtual reward for the first virtual check-in location.

The invention claimed is:

1. A method of displaying a map in an interactive virtual reality system, the method comprising:

transmitting virtual reality data to a user device, the virtual reality data corresponding to the map that includes a user location corresponding to a real-world location of the user device within the map and an avatar position corresponding to the real-world location, the avatar position updating as the user location updates;

transmitting reward location data to the user device, the reward location data corresponding to a plurality of virtual reward locations located within the map wherein each virtual reward location within a predetermined proximity of the avatar position is identified with a specific reward icon and each virtual reward location outside the predetermined proximity is identified with a general reward icon;

displaying the avatar position and reward location data on the map at the user device;

receiving from the user device a first user input comprising a movement of a user to a first real-world user location such that a first virtual reward location is within the predetermined proximity of a first avatar position at a virtual location corresponding to the first real-world user location;

in response to receiving the first user input, transforming a first general reward icon of the first virtual reward location into a first specific reward icon;

receiving from the user device a second user input comprising a selection of the first specific reward icon, wherein the second user input is associated with collecting a virtual reward at the first virtual reward location;

in response to receiving the second user input, determining whether the user has satisfied criteria for collecting the virtual reward while within a predetermined proximity of the first real-world user location, wherein determining whether the user has satisfied criteria for collecting the virtual reward is based on data received by the user device in response to the user device scanning an optical code or an RFID tag;

in response to determining that the user has satisfied criteria for collecting the virtual reward while within the predetermined proximity of the first real-world user location, transmitting notification data to the user device, the notification data indicating that the user has collected the virtual reward;

in response to determining that the user has satisfied criteria for collecting the virtual reward while within the predetermined proximity of the first real-world user location, transmitting reward data to the user device, the reward data corresponding to the virtual reward for the first virtual reward location, wherein an indication of the notification data and an indication of the reward data are displayed on a screen of the user device;

determining that a total number of virtual rewards collected at the first virtual reward location exceed a predetermined number of rewards;

in accordance with determining that the total number of virtual rewards collected at the first virtual reward location exceeds the predetermined number: transmitting a command to the user device, the command comprising instructions to remove the first virtual reward location from the map; and updating, by the user device, the display of the map to remove the first virtual reward location.

2. The method of claim 1, wherein the reward data includes a first option and a second option and the method further comprises receiving from the user device a selection of either the first option or the second option.

3. The method of claim 2, wherein the first option enables a user to redeem a full-value reward usable at a specific real-world merchant and the second option enables a user to redeem a lesser-value digital unit that can be stored in a digital wallet.

4. The method of claim 1, wherein the specific reward icon is a merchant-specific icon corresponding to a real-world merchant offering a reward at the virtual reward location identified by the specific reward icon.

5. The method of claim 4, wherein when the avatar position is within a predetermined proximity of a first virtual reward location and a second virtual reward location, the specific reward icon identifying each of the first virtual reward location and the second virtual reward location is a unique merchant-specific icon corresponding to different real-world merchants.

6. The method of claim 1, wherein receiving the second user input from the user device occurs automatically when the user device scans the QR code or the RFID tag at a real-world location corresponding to the first virtual reward location.

7. The method of claim 1, wherein receiving the second user input from the user device occurs automatically when the user location is within a predetermined distance of a GPS beacon located at a real-world location corresponding to the first virtual reward location.

8. The method of claim 1, wherein the virtual reward can only be used within a predetermined time after transmitting the reward data.

9. The method of claim 1, wherein the virtual reward is a digital unit that can be used at a real-world merchant corresponding to the first virtual reward location.

10. The method of claim 9, wherein the digital unit can only be used at the real-world merchant within a predetermined time after transmitting the reward data.

11. The method of claim 10, wherein the real-world merchant pays a fee when the virtual reward is collected at a virtual location corresponding to the real-world merchant.

12. The method of claim 1, further comprising transmitting bonus reward data to the user device, the bonus reward data being transmitted randomly.

13. The method of claim 1, wherein the virtual reward is a digital unit that corresponds to a real-world currency.

14. The method of claim 13, further comprising, after receiving a third user input, converting the digital unit to the real-world currency; and transmitting currency data to the user device, the currency data corresponding to the real-world currency value of the digital unit.

15. The method of claim 14, further comprising, after receiving a fourth user input, transferring the real-world currency value of the converted digital unit to a bank account.

16. The method of claim 14, wherein converting the digital unit to real-world currency cannot occur until after completion of a vesting schedule.

17. The method of claim 16, wherein completion of the vesting schedule requires allowing a predetermined period of time to pass after transmitting the reward data.

18. A non-transitory machine readable medium storing instructions that, when executed by at least one processor of a computing system, cause the system to perform operations comprising:

transmitting virtual reality data to a user device, the virtual reality data corresponding to a map that includes a user location corresponding to a real-world location of the user device within the map and an avatar position corresponding to the real-world location, the avatar position updating as the user location updates;

transmitting reward location data to the user device, the reward location data corresponding to a plurality of virtual reward locations located within the map wherein each virtual reward location within a predetermined proximity of the avatar position is identified with a specific reward icon and each virtual reward location outside the predetermined proximity is identified with a general reward icon;

displaying the avatar position and reward location data on the map at the user device;

receiving from the user device a first user input comprising a movement of a user to a first real-world user location such that a first virtual reward location is within the predetermined proximity of a first avatar position at a virtual location corresponding to the first real-world user location;

in response to receiving the first user input, transforming a first general reward icon of the first virtual reward location into a first specific reward icon;

receiving from the user device a second user input comprising a selection of the first specific reward icon, wherein the second user input is associated with collecting a virtual reward at the first virtual reward location;

in response to receiving the second user input, determining whether the user has satisfied criteria for collecting the virtual reward while within a predetermined proximity of the first real-world user location, wherein determining whether the user has satisfied criteria for collecting the virtual reward is based on data received by the user device in response to the user device scanning an optical code or an RFID tag;

in response to determining that the user has satisfied criteria for collecting the virtual reward while within the predetermined proximity of the first real-world user location, transmitting notification data to the user device, the notification data indicating that the user has collected the virtual reward;

transmitting reward data to the user device, the reward data corresponding to the virtual reward for the first virtual reward location, wherein an indication of the notification data and an indication of the reward data are displayed on a screen of the user device;

determining a total number of virtual rewards collected at the first virtual reward location;

if the total number of virtual rewards collected at the first virtual reward location exceeds a predetermined number: transmitting a command to the user device, the command comprising instructions to remove the first virtual reward location from the map; and updating, by the user device, the display of the map to remove the first virtual reward location.

19. An interactive virtual reality system comprising:

one or more processors coupled to one or more memory devices, wherein the one or more memory devices include instructions that when executed by the one or more processors cause the system to:

transmit virtual reality data to a user device, the virtual reality data corresponding to a map that includes a user location corresponding to a real-world location of the user device within the map and an avatar position corresponding to the real-world location, the avatar position updating as the user location updates;

transmit reward location data to the user device, the reward location data corresponding to a plurality of virtual reward locations located within the map wherein each virtual reward location within a predetermined proximity of the avatar position is identified with a specific reward icon and each virtual reward location outside the predetermined proximity is identified with a general reward icon;

display the avatar position and reward location data on the map at the user device;

receive from the user device a first user input comprising a movement of a user to a first real-world user location such that a first virtual reward location is within the predetermined proximity of a first avatar position at a virtual location corresponding to the first real-world user location;

in response to receiving the first user input, transform a first general reward icon of the first virtual reward location into a first specific reward icon;

receive from the user device a second user input comprising a selection of the first specific reward icon, wherein the second user input is associated with collecting a virtual reward at the first virtual reward location;

in response to receiving the second user input, determine whether the user has satisfied criteria for collecting the virtual reward while within a predetermined proximity of the first real-world user location, wherein determining whether the user has satisfied criteria for collecting the virtual reward is based on data received by the user device in response to the user device scanning an optical code or an RFID tag;

in response to determining that the user has satisfied criteria for collecting the virtual reward while within the predetermined proximity of the first real-world user location, transmit notification data to the user device, the notification data indicating that the user has collected the virtual reward at the first virtual reward location;

in response to determining that the user has satisfied criteria for collecting the virtual reward while within the predetermined proximity of the first real-world user location, transmit reward data to the user device, the reward data corresponding to the virtual reward for the first virtual reward location, wherein an indication of the notification data and an indication of the reward data are displayed on a screen of the user device;

determine a total number of virtual rewards collected at the first virtual reward location;

if the total number of virtual rewards collected at the first virtual reward location exceeds a predetermined number: transmit a command to the user device, the command comprising instructions to remove the first virtual reward location from the map; and updating, by the user device, the display of the map to remove the first virtual reward location.

* * * * *